United States Patent [19]
Yokoyama

[11] Patent Number: 5,259,561
[45] Date of Patent: Nov. 9, 1993

[54] AUTOMATIC RESISTOR COIL WINDING APPARATUS

[76] Inventor: Mitsuhiro Yokoyama, 3115-1, Takao, Ohaza Kitamoto-shi, Saitama-ken 364, Japan

[21] Appl. No.: 677,765

[22] Filed: Mar. 29, 1991

[30] Foreign Application Priority Data

Mar. 30, 1990 [JP] Japan ................................. 2-87108
Mar. 30, 1990 [JP] Japan ................................. 2-87109

[51] Int. Cl.$^5$ ............................................. H01C 17/04
[52] U.S. Cl. ................................... 242/7.15; 29/618
[58] Field of Search .................. 242/7.15, 7.16, 7.14, 242/7.13, 7.03; 29/605, 618, 610.1; 219/56.22, 56.1

[56] References Cited

U.S. PATENT DOCUMENTS

| 1,061,947 | 5/1913 | Phillips | 242/7.15 |
|---|---|---|---|
| 1,994,373 | 3/1935 | Thorne | 242/7.16 |
| 2,531,962 | 11/1950 | Bancroft | 242/7.16 |
| 2,765,124 | 10/1956 | Sickles | 242/7.14 |
| 4,037,072 | 7/1977 | Johnson | 29/618 X |
| 4,635,865 | 1/1987 | Arnold | 242/7.14 X |
| 4,988,292 | 6/1961 | Bliss | 242/7.15 |

FOREIGN PATENT DOCUMENTS 245899 1/1926 United Kingdom ............... 242/7.15

Primary Examiner—Katherine Matecki
Attorney, Agent, or Firm—Longacre & White

[57] ABSTRACT

An automatic resistor coil winding apparatus comprises a core holding portion for holding both axial end portions of a cylindrical core of a resistor, in such a manner that the core is rotatable in the direction of the peripheral surface thereof, a resistor wire supply portion having a resistor wire supply nozzle for supplying a resistor wire, a welding electrode portion for welding the resistor wire to the leading end and the trailing end of the core, and a slide base carrying the resistor wire supply portion and the welding electrode portion. The resistor wire supply portion has a resistor wire fixing mechanism and a resistor wire supply nozzle advancing/retracting mechanism, and the resistor wire supply nozzle is disposed on the slide base so as to be located at the same position as the welding electrode portion. The resistor wire supply portion has a resistor wire supply nozzle rotating portion for rotating said resistor wire supply nozzle through a predetermined angle in either direction along the axis of the core held by the core holding portion thereby changing the direction of supply of the resistance wire.

17 Claims, 18 Drawing Sheets

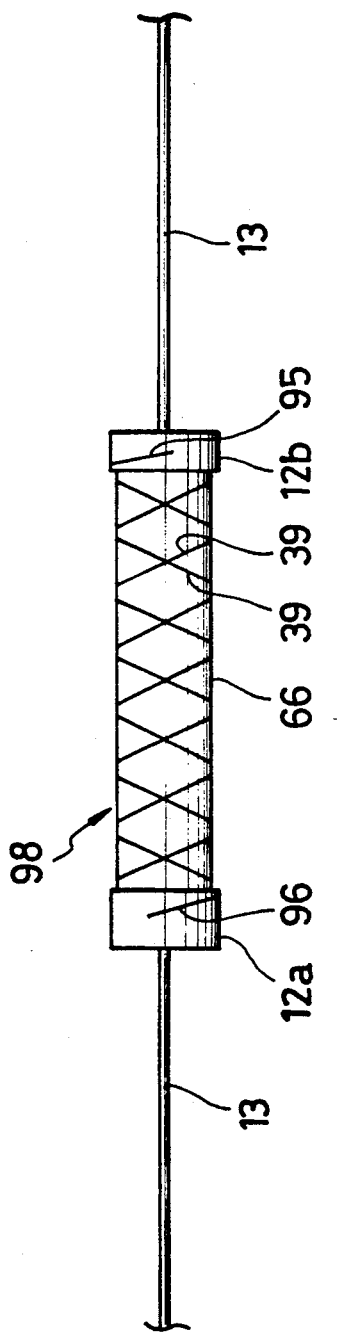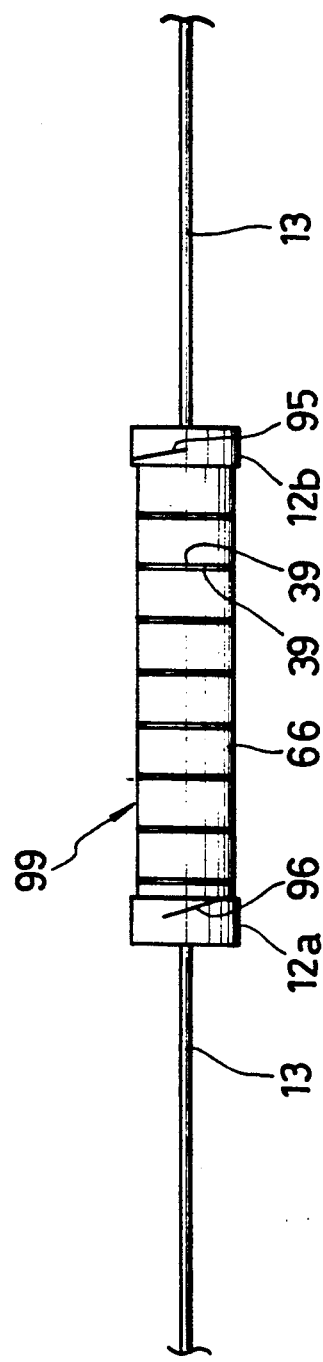

AUTOMATIC RESISTOR COIL WINDING APPARATUS

BACKGROUND OF THE INVENTION AND RELATED ARTS

The present invention relates to an automatic resistor coil winding apparatus and, more particularly, to an automatic resistor coil winding apparatus which is capable of continuously winding a resistor wire on a resistor core in both axial directions of the core.

In general, circuits of electronic devices and electric appliances such as VTR incorporate a large number of coil resistors.

As shown in FIG. 19, a coil resistor 10 includes a cylindrical small-sized ceramics core 11, caps 12a, 12b attached to both ends of the core 11, lead wires 13, 13 projecting axially outward from the caps 12a, 12b and a resistor wire 39 which is wound between the caps at a predetermined pitch on the surface of the core 11.

According to a conventional method for winding the resistor wire 39 on a resistor 10, the core 11 is chucked by a suitable chucking mechanism on a machine and the chucking mechanism fixing the core 11 is rotated while axially moving the core 11 so that the resistor wire 39 is wound on the peripheral surface of the core 11 with a manual aid.

In winding the resistor wire 39 on the core 11, the leading end of the resistor wire 39 is welded to one of the caps 12a, 12b on both axial ends of the core 11 before the winding and the terminal end of the wound resistor wire 39 is welded to the other of the caps 12a, 12b and cut, this completing the winding and fixing of the resistor wire 39. Thus, the winding and fixing of the resistor wire 39 on the core 11 requires quite a troublesome and laborious work, so that the efficiency of production of the coil resistor 10 is extremely low.

SUMMARY OF THE INVENTION

Accordingly, an object of the present invention is to improve the efficiency of production of coil resistors through automation of the work for winding the resistor wire to the core of a coil resistor.

According to the present invention, there is provided an automatic resistor coil winding apparatus, comprising:

a core holding portion for holding both axial end portions of a cylindrical core of a resistor, in such a manner that the core is rotatable in the direction of the peripheral surface thereof;

a resistor wire supply portion having a resistor wire supply nozzle for supplying a resistor wire to be wound on the peripheral surface of the core held by the holding portion;

a welding electrode portion for welding the resistor wire supplied from the resistor wire supply nozzle to the leading end and the trailing end of the core; and a slide base carrying the resistor wire supply portion and the welding electrode portion and reciprocatingly movable in the axial directions of the core held by the core holding portion;

the core holding portion including a pair of holding means arranged coaxially at a predetermined spacing from each other so as to be able to hold both ends of the core, a holding means drive portion for driving the pair of holding means towards and away from each other along the axis of the core, and a holding means rotating portion for rotating the core held by the holding means in the direction of the peripheral surface of the core;

the resistor wire supply portion including a resistor wire fixing mechanism for temporarily fixing the resistor wire supplied to the core and a resistor wire supply nozzle advancing/retracting mechanism capable of moving the resistor wire supply portion away from the core, the resistor wire supply nozzle being arranged on the slide base so as to be located at the same position as the welding electrode portion in the direction along the axis of the core held by the core holding portion;

the welding electrode portion including a pair of electrode members disposed above and below the core held at its both axial ends by the core holding portion, the electrode members being adapted to be moved substantially vertically to weld the resistor wire to the leading and trailing ends of the core, and an electrode drive portion for driving the electrode members up and down;

wherein the resistor wire supply portion having a resistor wire supply nozzle rotating portion for rotating the resistor wire supply nozzle through a predetermined angle in either direction along the axis of the core held by the core holding portion thereby changing the direction of supply of the resistance wire.

BRIEF DESCRIPTION OF THE DRAWINGS

wherein FIGS. 6 to 11 illustrate an operation in which the resistor wire is wound on a single core at a predetermined pitch from the leading end to the trailing end, in which:

FIG. 6 is an illustration of the state in which a resistor wire supply nozzle is spaced from a core held by a pair of holing means, so as to prepare for the supply of the resistor wire;

FIG. 7 is an illustration of a state in which the resistor wire supply nozzle has been moved closer to the core so as to bring the resistor wire into contact with an upper side of a leading end cap on the leading end of the core, while upper and lower electrode members have been projected such that the upper electrode member contacts the upper side of the leading end cap through the resistor wire and the lower electrode member contacts with the lower side of the same cap;

FIG. 8 is an illustration of a state in which the upper and lower electrode members have been retracted and a holding means rotating portion operates to rotate the core in the peripheral direction of the core so that the resistor wire with the leading end welded to the leading end cap is automatically and continuously fed from the resistor wire supply nozzle and wound on the peripheral surface of the core towards the trailing end of the core at a predetermined pitch;

FIG. 9 is an illustration of the state in which a resistor wire continuously supplied from the resistor wire supply nozzle has been wound on the core down to the trailing end of the wire so as to reach the trailing end cap, and the register wire supply nozzle mounting portion is rotated clockwise around the electrode members.

FIG. 10 is an illustration of a state in which the resistor wire supply nozzle is rotated clockwise around the electrode members as viewed in FIG. 9 so that the resistor wire is placed obliquely to the trailing end cap, the upper and lower electrode members being again projected to contact with the upper and lower sides of the cap so as to clamp said cap therebetween;

FIG. 11 is an illustration of a state in which an electric current is supplied to flow between the upper and the lower electrode members so as to weld the resistor wire to the trailing end cap and, at the same time, a resistor wire supply nozzle advancing/retracting mechanism is operated so that a resistor wire supply nozzle is retracted while the resistor wire is fixed by a resistor wire fixing mechanism, so that the resistor wire is pulled rearward and melt-cut at the point where the wire is welded to the trailing end cap;

FIGS. 12 to 16 are illustrations of the state in which winding of the resistor wire is conducted on a core different from that shown in FIGS. 6 to 11, from the winding termination position for the preceding winding cycle, in which:

FIG. 12 is an illustration of a state in which the resistor wire supply nozzle has been rotated counterclockwise through a predetermined angle from the position shown in FIG. 11 to prepare for supplying the resistor wire in a direction perpendicular to the axis of the new core which is held on the core holding portion;

FIG. 13 is an illustration of a state in which the core supply nozzle has been brought closer to the core and the upper and lower electrode members have been projected to clamp said core with the resistor wire held in contact with the upper surface of the leading end cap, with an electrical current supplied between the upper and lower electrode members so as to weld the resistor wire to the leading end cap;

FIG. 14 is an illustration of the state in which the holding means rotating portion has operated to rotate the core, while the resistor wire supply nozzle has been made to slide towards the trailing end of the core while keeping its posture perpendicular to the core, thereby continuously supplying and winding the resistor wire to the core;

FIG. 15 is an illustration of a state in which the resistor wire supply nozzle has been moved to the trailing end of the corer and the winding terminal end of the resistor wire will be welded to the trailing end cap, wherein the resistor wire supply nozzle rotating portion has been operated to rotate the resistor wire supply nozzle counter-clockwise through a predetermined angle around the electrode members which forms the center axis of rotation in the direction of the movement of the resistor wire supply nozzle so as to change the direction of supply of the resistor wire;

FIG. 16 is an illustration of a state in which the upper and the lower electrode members have been projected to clamp the core 11 and an electrical current is supplied between the upper and lower electrode members so as to weld the resistor wire to the trailing end cap, and then the resistor wire supply nozzle is retracted while the resistor wire is fixed by the resistor wire fixing mechanism, thereby melt-cutting the resistor wire;

FIGS. 17 and 18 are illustrations of different examples of winding of resistor wire on a core by the automatic resistor coil winding apparatus of the present invention, in which:

FIG. 17 is a side elevational view of a coil resistor formed by winding resistor wires in a crossing manner;

FIG. 18 is a side elevational view of a coil resistor formed by winding a pair of resistor wires wound in close contact, with each other at a predetermined pitch.

DESCRIPTION OF THE PREFERRED EMBODIMENTS

Figure 1:
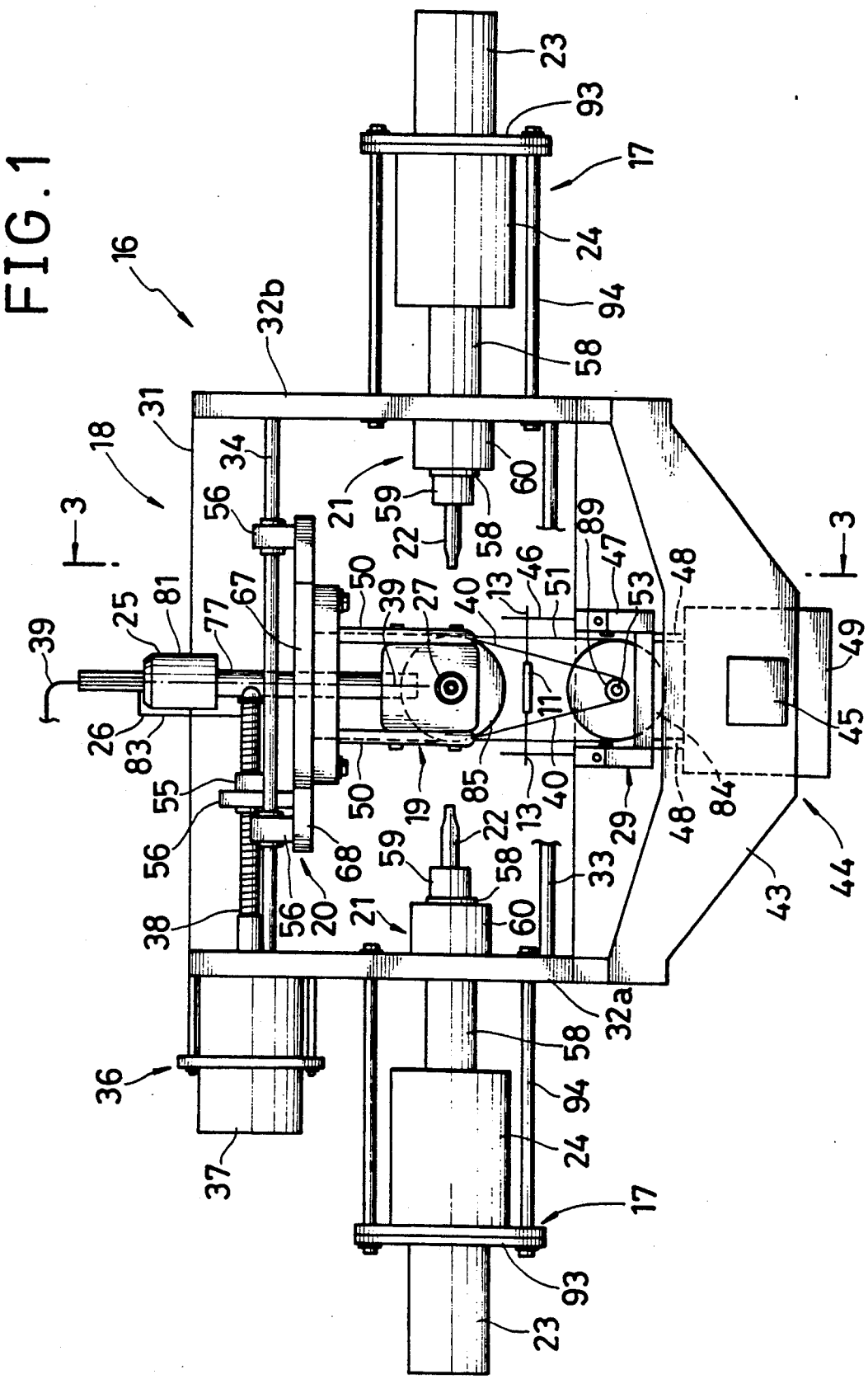
FIG. 1 is a plan view of an embodiment of the automatic resistor coil winding apparatus of the present invention.

As will be seen from FIG. 1, an embodiment of the automatic resistor coil winding apparatus 16 of the present invention comprises the following parts:

a core holding portion 17 for holding both axial end portions of a cylindrical core 11 of a resistor, in such a manner that the core 11 is rotatable in the direction of the peripheral surface thereof;

a resistor wire supply portion 18 having a resistor wire supply nozzle 77 for supplying a resistor wire 39 to be wound on the peripheral surface of the core 11 held by the holding portion 17;

a welding electrode portion 19 for welding the resistor wire 39 supplied from the resistor wire supply nozzle 77 to the leading end and the trailing end of the core 11; and a slide base 20 carrying the resistor wire supply portion 18 and the welding electrode portion 19 and reciprocatingly movable in the axial directions of the core 11 held by the core holding portion 17.

Figure 3:
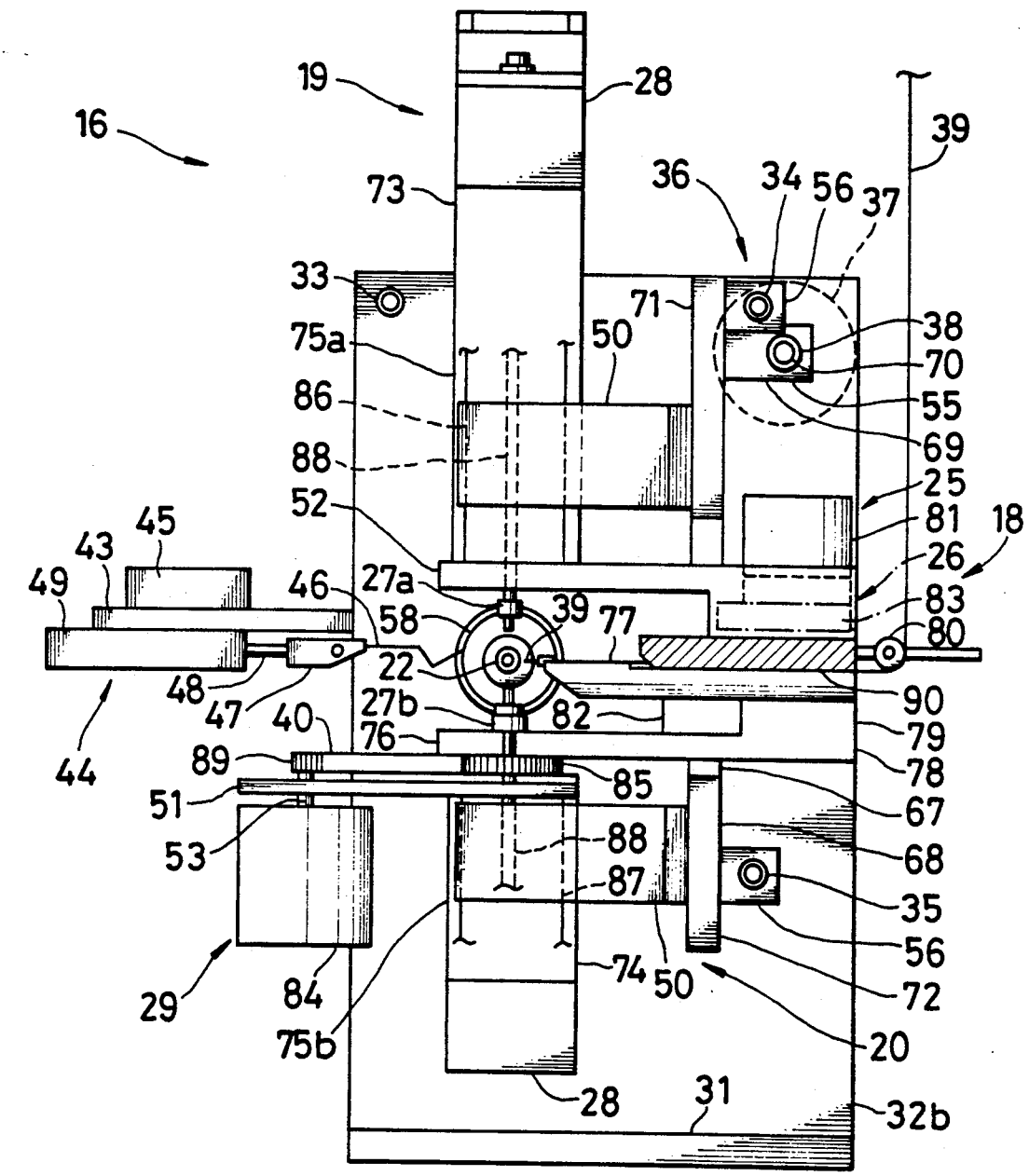
FIG. 3 is a sectional view of the automatic resistor coil winding apparatus of the invention taken along the line 3—3 of FIG. 1.

As will be seen from FIGS. 1 and 3, the automatic resistor coil winding apparatus 16 has a bottom plate frame 31 with a substantially rectangular bottom plate. A pair of rectangular side plate frames 32a, 32b protrude from both longitudinal ends of the bottom plate frame 31. The opposing side plate frames 32a, 32b are connected to each other through a rod 33.

The core holding portion 17 is fixed to heightwise mid portions of the side plate frames 32a, 32b.

Figure 4:
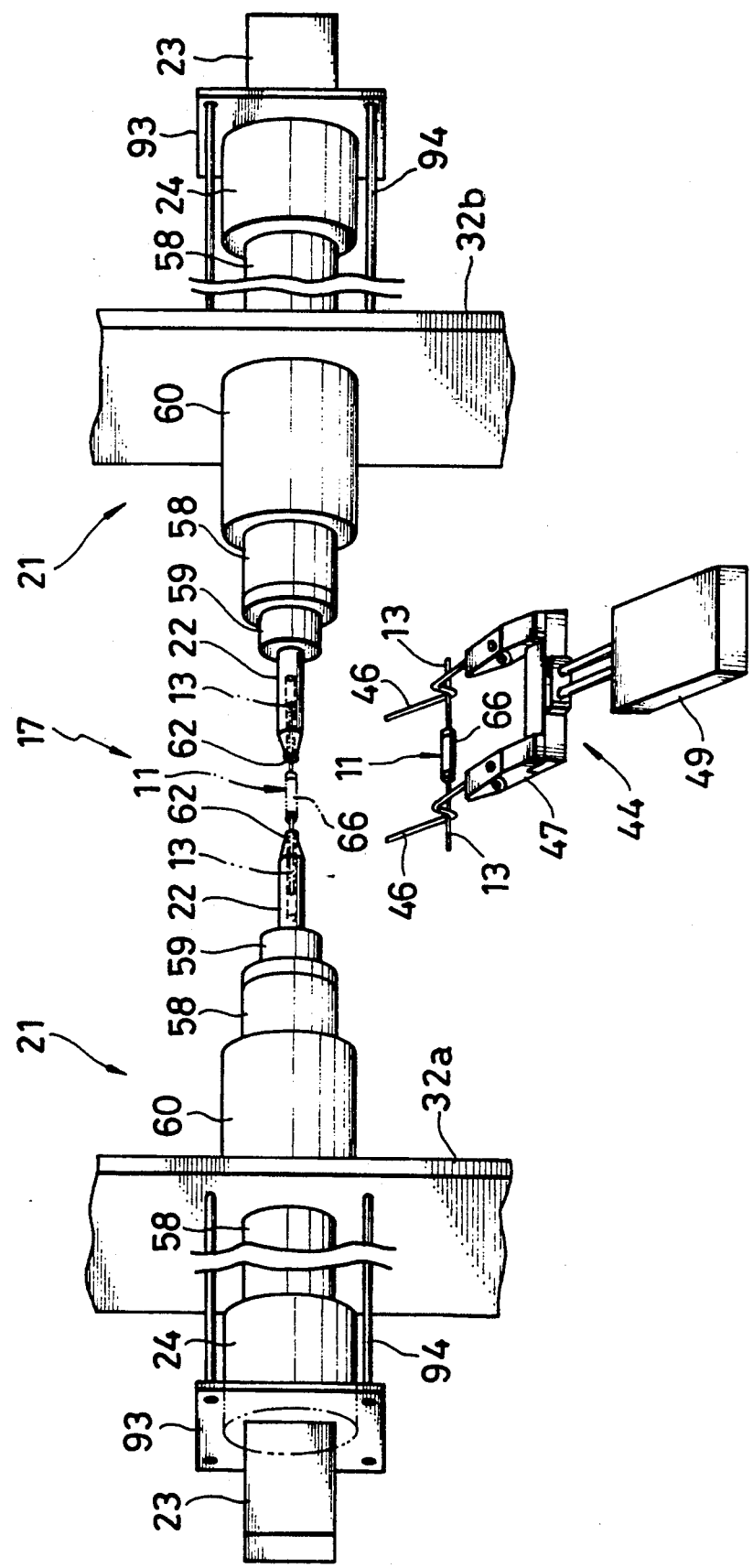
FIG. 4 is a perspective view illustrating an embodiment of a core holding portion and a core supplying portion which are incorporated in the automatic resistor coil winding apparatus of the present invention.

As will be seen from FIG. 4, the core holding portion 17 includes a pair of holding means 21, 21 arranged coaxially at a predetermined spacing from each other so as to be able to hold both ends of the core 11, a holding means drive portion 23, 23 for driving the pair of holding means 21, 21 towards and away from each other along the axis of the core 11, and a holding means rotating portion 24, 24 for rotating the core held by the holding means in the direction of the peripheral surface of the core.

The holding means 21, 21 include cylindrically-shaped chucks 22, 22, chuck fixing portions 59, 59 for fixing the chucks 22, 22, spindle portions 58, 58 from the ends of which the chuck fixing portions 59, 59 are projected, and casing portions 60, 60 in which the spindle portions 58, 58 are mounted for movement back and forth.

Holding means rotating portions 24, 24 including pulse motors are provided on the rear ends of the spindle portions 58, 58 which are disposed in the casing members 60, 60 for movement back and forth. Holding means drive portions 23, 23 including pneumatic cylinders are disposed on the outer sides of said holding means rotating portions 24, 24.

Figure 2:
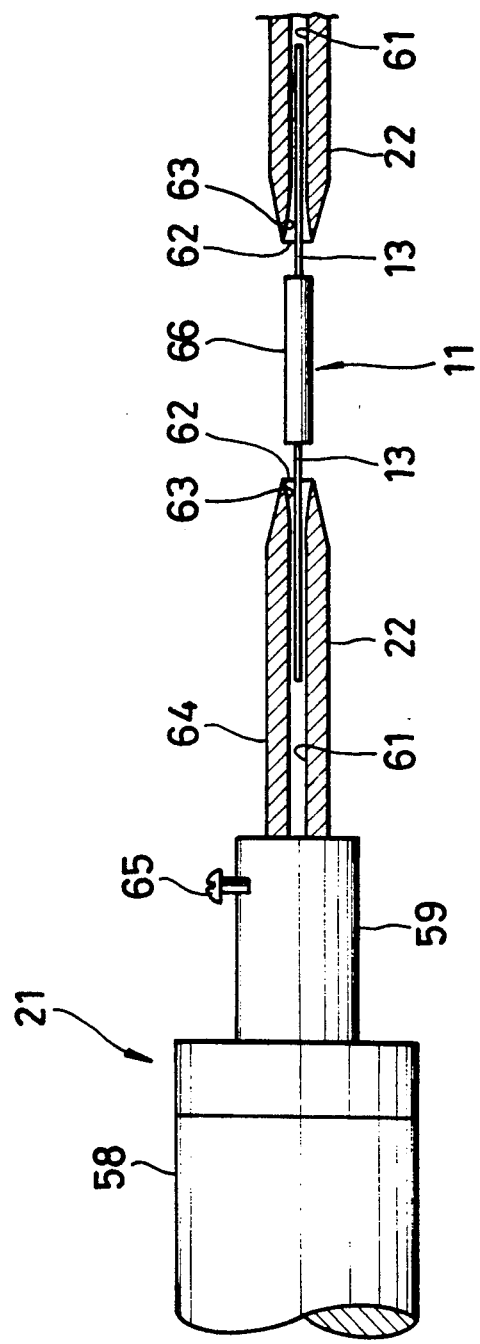
FIG. 2 is a partly-sectioned side elevational view of a holding means which is used in the automatic resistor coil winding apparatus of the present invention.

As will be seen from FIGS. 1, 2 and 4, the chuck 22 has an elongated cylindrical form with an end which is tapered to reduce the diameter. An opening 62 is formed in the tapered end of the chuck 22. An elongated hole 61 having a diameter slightly greater than that of the lead wire 13 is formed in the chuck 22 so as to extend in the axial direction of the chuck 22. The inner surface of the chuck 22 defining the elongated hole 61 is provided with a taper 63 such that the diameter of the elongated hole 61 is progressively increased towards the end opening 62.

The chuck 22 has a base end 64 which is fastened to a chuck fixing portion 59 by a fixing means 65 which is provided on the peripheral surface of the chuck fixing portion 59.

Therefore, when the core 11 is held between a pair of chucks 22, 22 as shown in FIGS. 2 and 4, lead wires 13, 13 projecting from both ends of the body 66 of the core can easily be inserted into the end openings 62 by virtue of the tapered portions 63 of the elongated holes 61. The lead wires 13, 13 inserted into the elongated holes 61 through the openings 62 are smoothly received in the elongated holes by being guided by the tapered portions 63.

Thus, the tapered portions 63 function as guide for guiding the lead wires 13 projected from both ends of the core 11 so that the chucks 22, 22 can easily pres and hold both ends of the body 66 of the core 11.

As described above, lead wires 13, 13 projected from both ends of the core 11 are received in the elongated holes 61 formed in the chucks 22, 22 and having a diameter greater than that of the lead wire 13 so that the core 11 can be held with its axis extending horizontally in a so-called centered state.

The casing members 60, 60 have generally cylindrical forms and are fixed at their ends to the side plate frames 32b, 32b and extended through these side plate frames 32a, 32b. Spindles 58, 58 are rotatably extended through the casing members 60, 60. The above-mentioned chuck fixing portions 59, 59 are fixed to the ends of the spindles 58, 58 for rotation therewith.

The above-mentioned holding means rotating portions 24, 24 are fixed to the rear ends of the spindle portions 58, 58. The holding means rotating portions 24, 24 include pulse motors which are adapted to rotate the chuck fixing portions 59, 59 fixed to the ends of the spindle portions 58, 58 thereby to rotate the chucks 22, 22.

Holding means drive portions 23, 23 are provided on the outer sides of the holding means rotating portions 24, 24. The holding means drive portions 23, 23 include pneumatic cylinders and are fixed to the adapter plates 93, 93 which are secured to the side plate frames 32a, 32b through four fixing rods 94. The holding means drive portions 23, 23 are connected to the holding means rotating portions 24, 24 through pistons (not shown).

The operation of the holding means drive portions 23 drives the holding means rotating portions 24, 24, the spindle portions 58, 58 to the rear ends of which the holding means rotating portions 24, 24 are secured, the chuck fixing portions 59, 59 fixed to the spindle portions 58, 58, and the chucks 22, 22 fixed to the chuck fixing portion 59, 59 so as to bring the chucks 22 linearly to a position inside the apparatus 16 where the chucks 22, 22 are capable of holding the core 11 and also back from this position to the initial position.

Therefore, as shown in FIG. 4, the holding of the core 11 by the chucks 22, 22 is conducted by actuating the core supply portion 44 so as to bring the core 11 to a position where the axis of the core 11 is aligned with the common axis of the chucks 22, 22, and then actuating the holding means drive portions 23, 23 so as to move the chucks 22, 22 towards each other from positions on the outer sides of the lead wires 13, 13, thereby clamping the core 11 at both ends of the body 66 thereof.

As will be seen from FIGS. 1 and 3, vertically-spaced guide rails 34, 35 are extended between the opposing side plate frames 32a, 32b near the rear side of the apparatus. A slide base 20 is provided between these guide rails 34, 35. The slide base 20 has a generally rectangular frame 68 provided therein with a rectangular bore 67. Slide mounting portions 56 are provided on four corners of the rear wall of the frame 68. The arrangement is such that the slide base 20 is moved reciprocatingly along the guide rails 34, 35.

A slide base drive portion 36 is provided in the rear side of the slide base 20. The slide base drive portion 36 includes a reversible pulse motor 37, a feed screw portion 38 extended from the spindle of the pulse motor 37, and an inverse threaded portion 55 projected from the rear surface of the slide base 20 and meshing with the feed screw portion 38.

The pulse motor 37 of the slide base drive portion 36 is fixed to a rear upper portion of the outer surface of the side plate frame 32a. The feed screw portion 38 is externally threaded and fixed to the spindle of the pulse motor 37 and is extended to the left and right of the automatic resistor coil winding apparatus 16 through the side pate frame 32a.

The inverse threaded portion 55 includes an arm portion 69 having a substantially rectangular side elevation and projected from the rear surface of the frame 68 forming the slide base 20, and a threaded hole 70 formed in the arm portion 69. The threaded hole 70 is threaded at the same pitch as the feed screw portion 38 so as to mesh with the screw thread on the feed screw portion 38.

As shown in FIG. 3, an upper mounting surface portion 71 and a lower mounting surface portion 72 are provided on the front side of the frame 68 forming the slide base 20. An upper welding electrode portion 73 is fixed to the upper mounting surface portion 71, while a lower welding electrode portion 74 is attached to the lower mounting surface portion 72. The upper and lower welding electrode portions 73 and 74 form a welding electrode portion 19.

The upper and lower welding electrode portions 73 and 74 are fixed to the front side of the frame 68 forming the slide base 20 substantially perpendicularly to the frame 68. Electrode members 27a and 27b are projected from the lower end of the upper welding electrode portion 73 and from the upper end of the lower welding electrode portion 74, respectively.

The upper welding electrode portion 73 and the lower welding electrode portion 74 are respectively provided with rectangular bodies 75a and 75b, electrode drive portions 28 and 28 fixed to the upper and lower ends of the bodies 75a and 75b, electrode drivers 28 and 28 fixed to the upper and lower ends of the bodies 75a, 75b, and the above-mentioned electrode members 27a and 27b secured to the lower and upper ends of the bodies 75a and 75b.

The electrode members 27a and 27b are provided on the same vertical axis and are arranged such that the extension of the common axis of the electrode members 27a, 27b orthogonally crosses the common axis of the chucks 22, 22.

The aforementioned resistor wire supply portion 18 is interposed between the upper welding electrode portion 73 and the lower welding electrode portion 74 which form the welding electrode portion 19.

As will be seen from FIG. 3, the resistor wire supply portion 18 includes a resistor wire supply nozzle mounting portion 78 having a substantially U-shaped side elevation, and a resistor wire supply nozzle 77 fixed to the resistor wire supply nozzle mounting portion 78.

The resistor wire supply nozzle mounting portion 78 includes an adapter plate portion 52 connected to the lower end of the body 75a of the upper welding electrode 73, another adapter plate portion 76 secured to the upper end of the body 75b of the lower electrode mounting portion 74 so as to vertically oppose the adapter plate portion 52 and a resistor wire supply nozzle fixing portion 79 provided on the rear ends of the adapter plate portions 52, 76.

The adapter plate portions 52 and 76 are secured to the bodies 75a, 75b of the upper and lower welding electrode portions 73 and 74 such that the resistor wire supply nozzle mounting portion 78 is rotatable horizontally about the electrode members 27a, 27b which forms the center axis of rotation. A resistor wire supply nozzle 77 is fixed to the above-mentioned resistor wire supply nozzle fixing portion 79.

The resistor wire supply nozzle 77 is attached to a slide base 82 provided on the rear end of the adapter plate 76 so as to be slidable forwardly and rearwardly of the automatic resistor coil winding apparatus 16 of this embodiment. A pulley 80 is rotatably mounted on the rear end of the resistor wire supply nozzle 77. The resistor wire 39 is wound from a resistor wire bobbin (not shown) and is fed axially through the pulley 80 and through the resistor wire supply nozzle 77 so as to be delivered axially forwardly from the front end of the resistor wire supply nozzle 77.

A resistor wire fixing mechanism 25 is provided on the resistor wire supply nozzle 77. The resistor wire fixing mechanism 25 includes a drive mechanism 81 having resistor wire clamper 90 and a pneumatic cylinder for actuating the resistor wire clamper 90, and is capable of fixing the resistor wire 39 when required.

The resistor wire supply nozzle 77 has a resistor wire supply nozzle advancing/retracting mechanism 26 being capable of driving the resistor wire supply nozzle 77 forwardly and rearwardly of the automatic resistor coil winding apparatus 16.

The resistor wire supply nozzle advancing/retracting mechanism 26 includes the above-mentioned slide base 82 and a drive portion 83 provided on the slide base 82 and being capable of moving the resistor wire supply nozzle 77 forward and backward. The drive portion 83 includes a pneumatic cylinder.

More specifically, the resistor wire supply nozzle advancing/retracting mechanism 26 is adapted for retracting the resistor wire supply nozzle 77 away from the core 11 when the resistor wire 39 is welded to the core 11 by the welding electrode portion 19 and for advancing the same towards the core 11 after the welding.

As will be seen from FIG. 3, the resistor wire supply nozzle mounting portion 78 to which the resistor wire supply nozzle 77 is secured is fixed to cylindrical shaft portions 86, 87 which extend longitudinally through the bodies 75a, 75b of the upper and lower welding electrode portions 73, 74. Thus, the resistor wire supply nozzle mounting portion 78 is fixed to the frame 68 by mounting portions 50, 50 through the upper and lower welding electrode portions 73, 74 receiving the cylindrical shaft portions 86, 87.

Thus, the fixing plates 52, 76 to which the resistor wire supply nozzle 77 is secured are fixed at their front ends to the cylindrical shaft portions 86, 87.

Furthermore, the electrode members 27a, 27b provided on the upper and lower ends of the upper and lower welding electrode portions 73, 74 are fixed to one ends of arms 88, 88 which are received in the cylindrical shaft portions 86, 87 and which are connected at their other ends to the electrode drivers 28, 28. The cylindrical shaft portions 86, 87 are rotatably received in the bodies 75a, 75b. The upper end of the arm portion 88 mounted in the lower welding electrode portion 74 projects outward from the body 75b and a gear 85 of a predetermined width is formed on the projected end of the arm portion 88.

The illustrated embodiment has a resistor wire supply nozzle rotating portion 29 which is capable of rotating the resistor wire supply nozzle 77 to either direction about the electrode members 27a, 27b which forms the center axis of rotation along the axis of the core 11 which is held by the core holding portion 17.

As will be seen from FIGS. 1 to 3, the resistor wire rotating portion 29 has a drive portion 84 including a pulse motor, an adapter plate 51 for fixing the drive portion 84 to the lower welding electrode portion 74, the aforementioned cylindrical shaft portion 86 fixed at its lower end to the upper side of an end of the aforementioned fixing plate portion 52 and rotatably received in the upper welding electrode portion 73, a cylindrical shaft portion 87 fixed at its upper end to the lower side of the end of the fixing plate portion 76 and rotatably received in the lower welding electrode portion 74, a drive gear 89 fixed to a spindle portion 53 projected upward from the upper end of the drive portion 84, a gear portion 85 formed on the upper end of the cylindrical shaft portion 87, and a belt 40 stretched between the drive gear 89 and the gear portion 85.

The inner peripheral surface of the belt 40 is toothed so as to mesh with the gear portion 85 and the drive gear 89 which is fixed to the upper end of the spindle portion 53.

Therefore, when the drive portion 84 including the pulse motor is operated, the rotation of the drive gear 89 fixed to the spindle portion 53 is transmitted to the gear portion 85 through the belt 40 so that the cylindrical shaft portion 87 on which the gear portion 85 is formed and the cylindrical shaft portion 86 are rotated in either one of the circumferential directions about the electrodes 27a and 27b which forms the center axis of rotation.

As a result of the rotation of the cylindrical shaft portions 86 and 87, the resistor wire supply nozzle mounting portion 78 to which the fixing plates 52, 76 are fixed is rotated about the electrode members 27a, 27b which forms the center axis of rotation within the rectangular bore 67 which is formed in the frame 68 forming the slide base 20, with the result that the resistor wire supply nozzle 77 also is rotated through a predetermined angle about the electrode members 27a, 27b which forms the center axis of rotation. The angle of rotation of the resistor wire supply nozzle 77 is adjustable within the range between 0° and 30°.

As will be seen from FIGS. 1 and 3, a table 43 is provided on the front side of the side plate frames 32a, 32b substantially at heightwise mid portion of these frames 32a, 32b. A core supply portion 44 is provided on the underside of the table 43.

As will be seen from FIGS. 1, 3 and 4, the core supply portion 44 is provided with a pneumatic cylinder 45 provided on the upper side of the table 43, a drive portion 49 actuated by the pneumatic cylinder 45, a pair of pistons 48, 48 projected from the drive portion 49 towards the rear wise of the automatic resistor coil winding apparatus 16, an arm portion 47 having a substantially U-like planar shape and fixed to the ends of the pistons 48, 48, and core support arms 46, 46 projected forwardly from the arm portion 47.

The core supply portion 44 is so constructed that it supports the core 11 with the lead wires 13,13 projected from both ends of the body 66 of the core 11 resting on the support arms 46, 46.

In the operation of the core supply portion 44, the pneumatic cylinder 45 is operated to actuate the drive portion 49 while the core 11 is held on the core support arm 46, so that the pistons 48, 48 are projected forward into the automatic resistor coil winding apparatus 16, whereby the core 11 is brought to a position on the common axis of the chucks 22, 22.

In the illustrated embodiment, a compressed air supply portion (not shown) for supplying the above-mentioned pneumatic cylinders is provided beneath the automatic resistor coil winding apparatus 16, as well as a control unit for controlling the operations of various portions of the illustrated embodiment of the automatic resistor coil winding apparatus 16.

The control unit incorporates a computer so that it can control operations of the components of the apparatus to produce coil resistors of various specifications in response to data such as the resistance value of the coil resistor to be produced, radius of the core, length of the core and so forth inputted through a control panel.

The operation of the illustrated embodiment of the automatic resistor coil winding apparatus 16 will be described hereinunder.

As the first step, described specifications of the coil resistor to be produced, e.g., the resistance value of the resistor to be obtained, diameter and length of the core, resistance of the resistor wire per unit length (one meter), and so forth, as well as the quantity of the resistors to be produced, are set and inputted through the control panel of the control unit mentioned above.

Then, the resistor wire 39 is threaded through the resistor wire supply nozzle 77 through the pulley 80 and set in the automatic resistor coil winding apparatus 16.

After receipt of the input data, the control unit calculates various factors such as the number of turns of the resistor wire 39 on the core 11, number of rotation of the shaft of the pulse motor forming the holding means rotating portion 24, and the rotation speed of the pulse motor 37 forming the slide base drive portion 36, and determines the pitch and the number of turns of winding of the resistor wire 39 on the core 11.

Subsequently, the core 11 which has been automatically fed from an external parts feeder (not shown) is moved by the core supply portion 44 to a position where the core 11 can be held by the chucks 22,22.

Namely, the pneumatic cylinder 45 of the core supply portion 44 is energized to actuate the drive portion 49 so as to forwardly extend the pistons 48, 48 so that the core 11, the lead wires 13, 13 of which rest on the core support arms 46, 46, is moved by the U-shaped arm portion 47 to the position where its axis is aligned with the common axis of the chucks 22,22, and then the arm portion 47 is stopped.

Thereafter, the pair of holding means drive portions 23 constituting the core holding portion 17 operate to move the pair of spindle portions 58, 58, holding means rotary portions 24, 24 on the rear ends of the spindle portions 58, 58, chuck fixing portions 59, 59 provided on the front ends of the spindle portions, 58, 58 and the chucks 22, 22 fixed by the chuck fixing portions 59, 59 towards the inner side of the automatic resistor coil winding apparatus 16.

Then, as shown by broken lines in FIG. 4, the chucks 22, 22 are moved toward each other from the outer sides of the lead wires 13, 13 projected from both ends of the core 11 which has been held by the core support arms 46, 46 coaxially with the chucks 22, 22.

Figure 6:
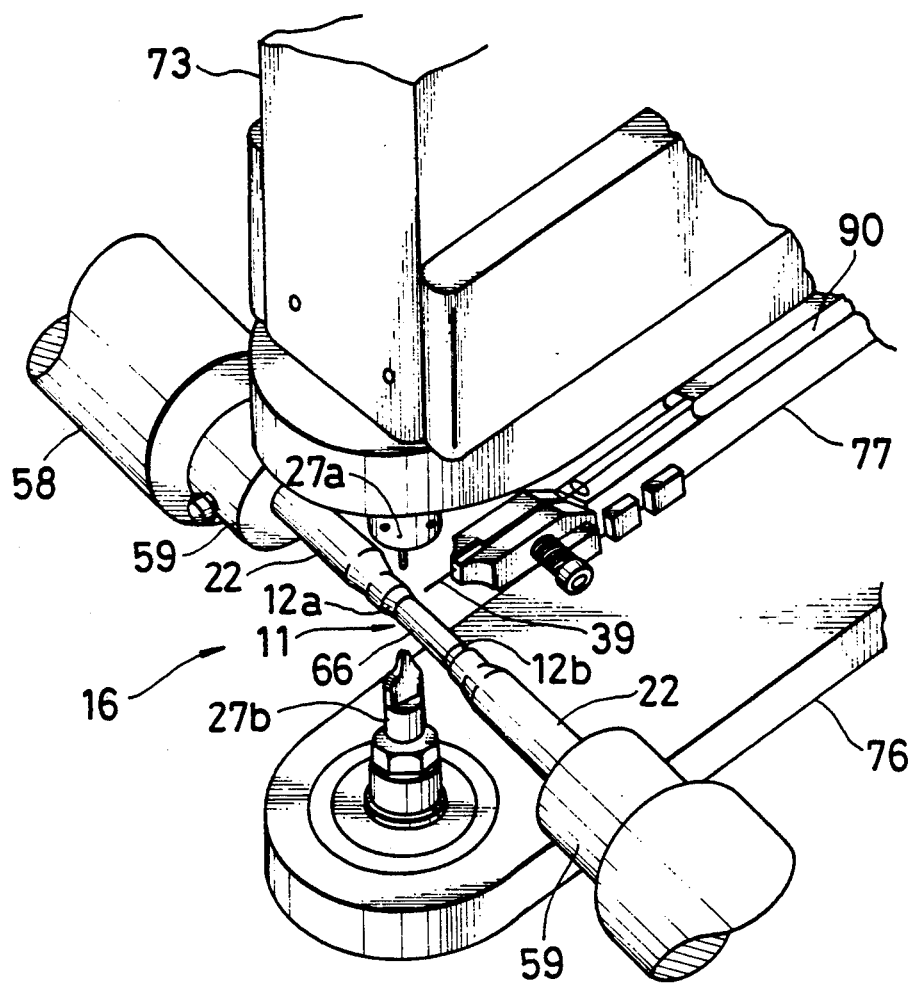
FIGS. 6 to 16 are perspective views of an embodiment of the resistor coil winding apparatus of the invention, illustrative of the operation for winding a resistor wire supplied from a resistor wire supply nozzle as resistor wire supply means on a core held by the holding means.

As a result, the lead wires 13, 13 are inserted into elongated holes 61, 61 formed axially in the chucks 22, 22, as shown in FIGS. 4 and 6, so that the chucks 22,22 contact both axial ends of the core body 66 so as to press the same, whereby the core 11 is held between the pair of chucks 22, 22.

Subsequently, the pneumatic cylinder 45 of the core supply portion 44 is energized to retract the piston 48 of the drive portion 49, so that the arm portion 47 and the support arms 46 which have supported the core 11 are retracted to the initial position so as to prepare for the supply of the next core 11.

Then, the drive portion 83 for the resistor wire supply nozzle advancing/retracting mechanism 26 is actuated to advance the resistor wire supply nozzle 77 on the slide base 82 towards the core 11 while keeping the resistor wire supply nozzle 77 perpendicularly to the core 11, so that the leading end of the resistor wire 39 projecting from the resistor wire supply nozzle 77 is brought into contact with an upper portion of the peripheral surface of a leading end cap 12a on the core 11.

Figure 5:
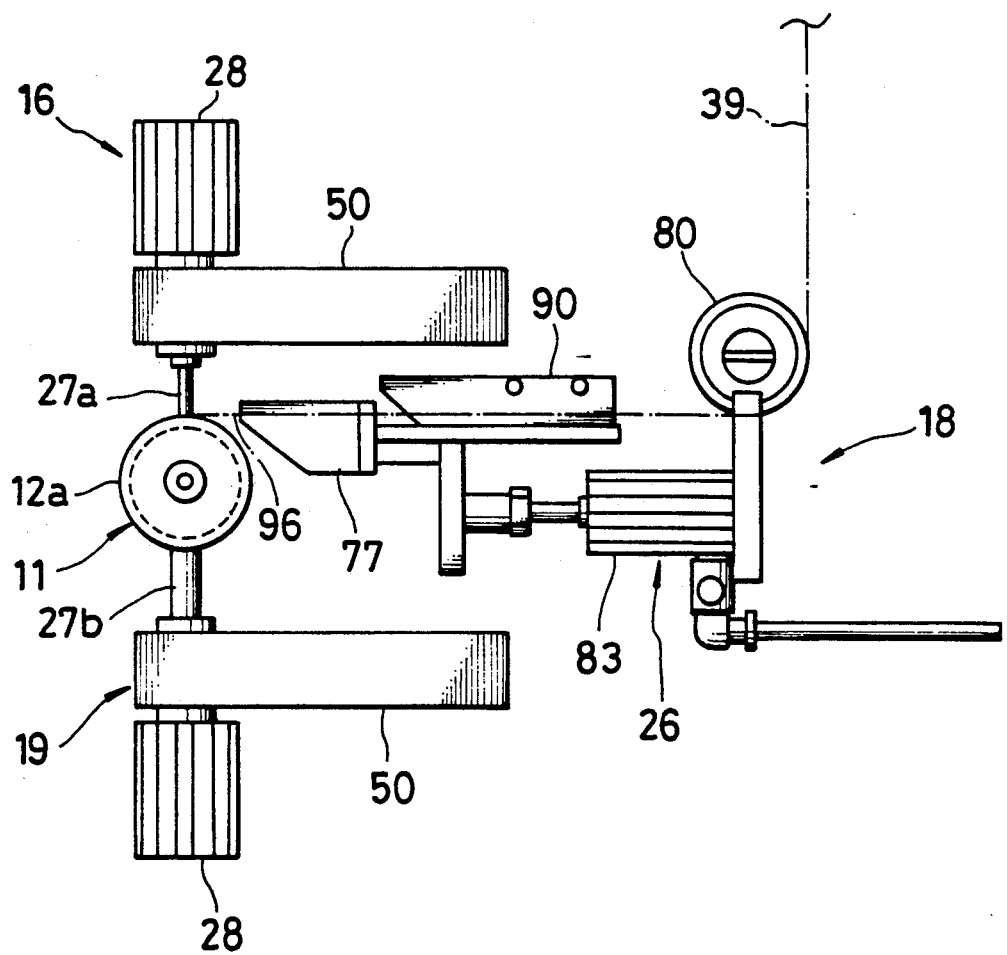
FIG. 5 is an illustration of concepts of a resistor wire supply portion and a welding electrode portion which are used in the automatic resistor coil winding apparatus of the present invention, wherein upper and lower electrode members constituting the welding electrode portion hold a core to which a resistor wire is supplied from a resistor wire supply nozzle as a resistor wire supply portion which has been advanced by a resistor wire supply nozzle advancing/retracting mechanism.

Subsequently, as shown in FIGS. 3 and 5, the electrode drivers 28, 28 provided in the upper and lower welding electrode portions 73, 74 forming the welding electrode portion 19 are activated to project the upper and lower electrode members 27a and 27b through the arms 88, 88 provided between the electrode drivers 28, 28 and the electrodes 27a, 27b.

Figure 7:
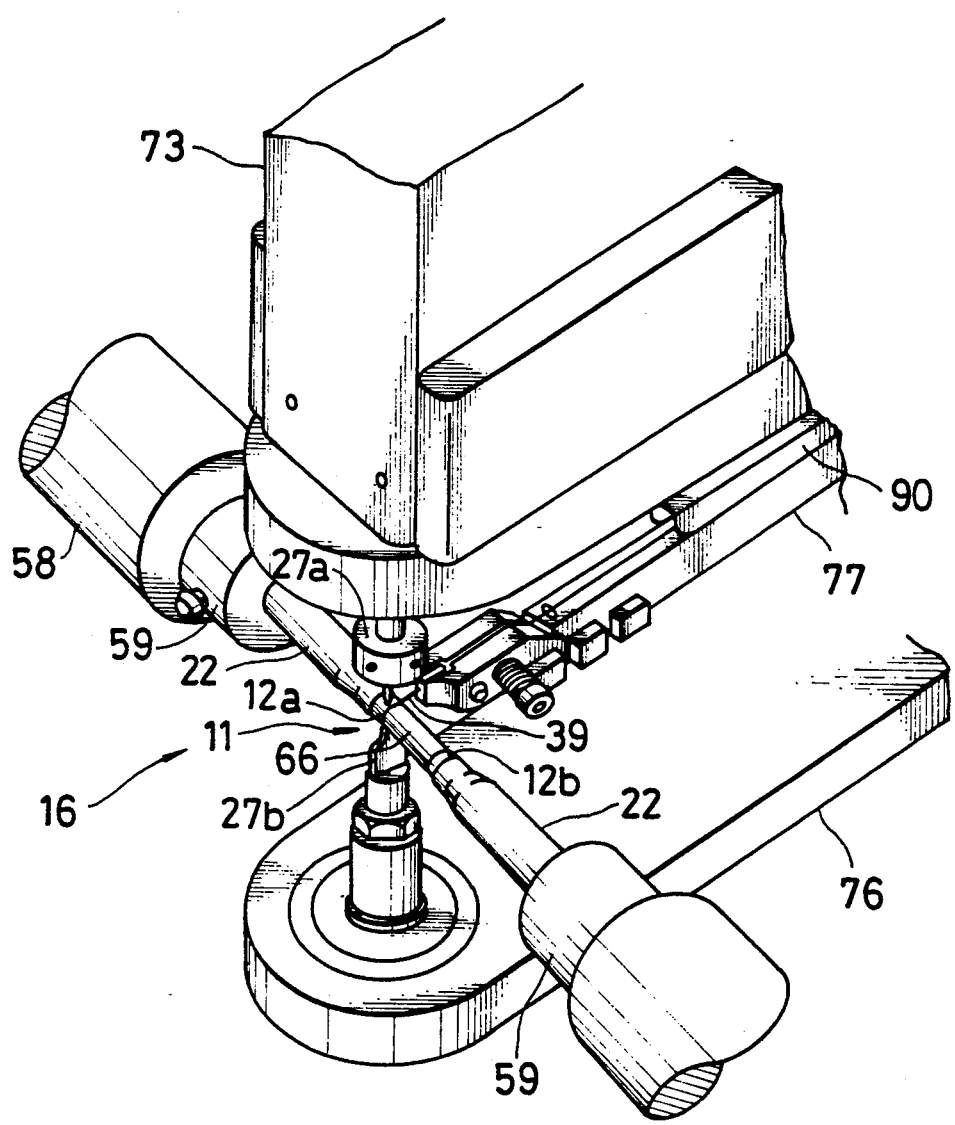

Consequently, as shown in FIG. 7, the lower welding electrode member 27b is brought into contact with a lower portion of the peripheral surface of the leading end cap 12a of the core 11 while the upper welding electrode member 27a is pressed against an upper portion of the peripheral surface of the leading end cap 12a through the intermediary of the resistor wire 39.

Therefore, as shown in FIG. 5, a welding current is supplied to flow between the upper and lower electrode members 27a and 27b, the leading end 96 of the resistor wire 39 is welded to the upper side of the peripheral surface of the leading end cap 12a of the core 11. Subsequently, the upper and lower electrode members 27a and 27b are retracted upward and downward away from the core 11 by the operation of the electrode drivers 28, 28.

Then, the holding means rotating portion 24 is activated to rotate the spindles 58, 58 so that the core 11 held on the spindles 58, 58 through the chucks 22,22 is rotated a predetermined number of turns, as shown in FIG. 1. At the same time, the pulse motor 37 of the slide base drive portion 36 is activated to rotate the feed screw portion 38.

As a result, the frame 68 having the inverse threaded portion 55 meshing with the feed screw portion 38 starts to slide towards the side plate from 32b, i.e., to the right as viewed in FIG. 1, in accordance with the rotation of the feed screw portion 38.

Figure 8:
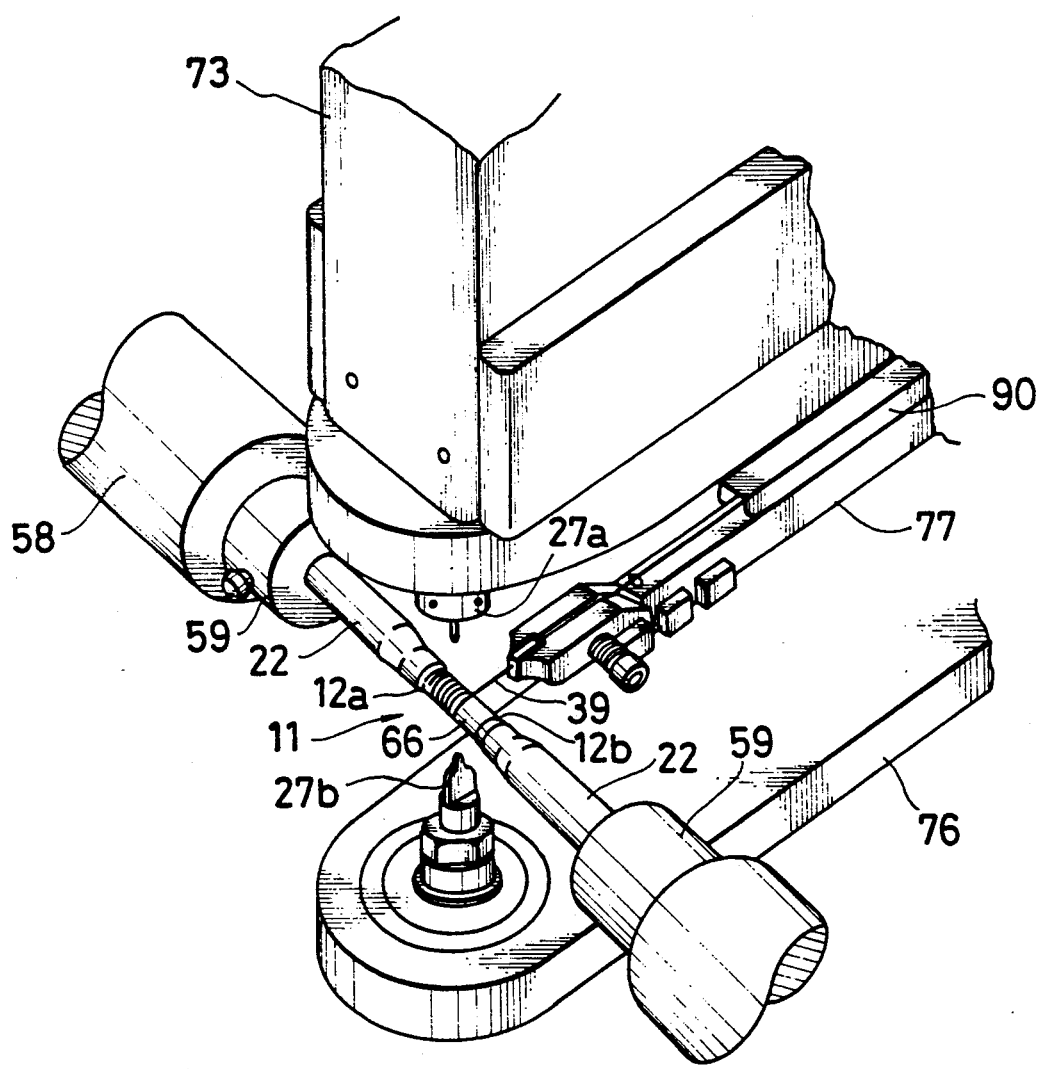

Thus, as shown in FIG. 8, the core 11 which is pressed between and held by the chucks 22, 22 rotate in accordance with the rotation of the spindles 58, 58, so that the resistor wire 39, the leading end of which is welded to the leading end cap 12a on the core 11, is continuously pulled from the resistor wire nozzle 77 and, further, the resistor wire supply nozzle 77 is moved towards the rear end of the core 11 along the axis of the core 11, whereby the resistor wire 39 is wound on the body 66 of the core 11 at the pitch which has been input through the control panel.

In this state, since the upper and lower welding electrode portions 73 and 74 forming the welding electrode portion 19 are fixed to the frame 68, the upper and lower welding electrode portions 73, 74 also are moved towards the trailing end of the core 11 along the axis of the core 11, together with the resistor wire supply nozzle portion 77.

Then, the resistor wire supply nozzle 77 reaches the rear end of the core body 66. In order to weld the winding terminal end 95 of the resistor wire 39, the spindles 58, 58 forming the core holding portion 17 are temporarily stopped. Then, the resistor wire supply nozzle rotating portion 29 is activated to rotate the resistor wire supply nozzle 77 through a predetermined angle in the direction of movement of the resistor wire supply nozzle 77 about the electrode member 27 which forms the center axis of rotation, thereby changing the direction of supply of the resistor wire 39.

Figure 9:
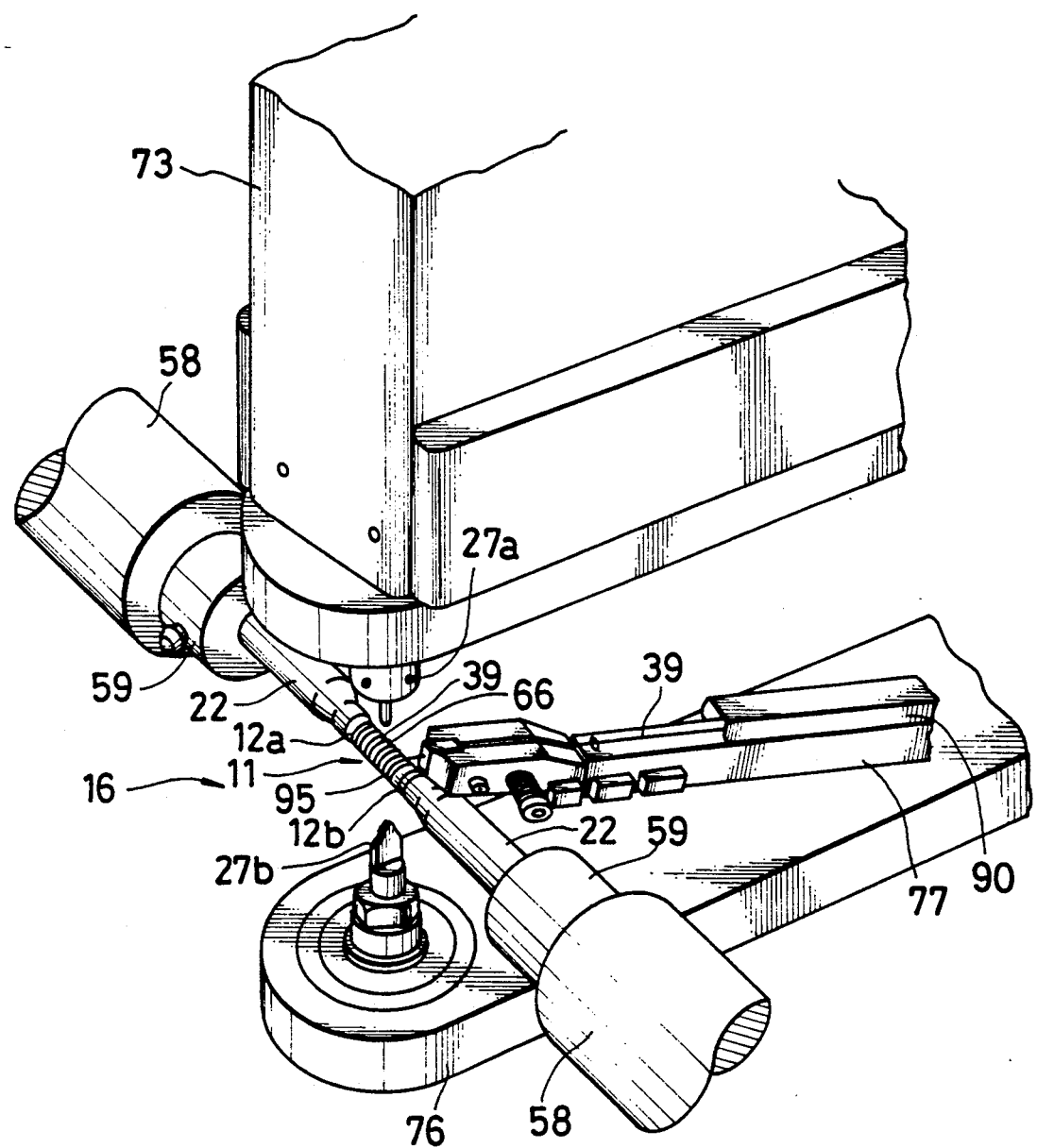

Thus, the pulse motor of the drive portion 84 which forms the resistor wire supply nozzle rotating portion 29 operates clockwise through a predetermined angle which is calculated from the input data, so that the gear portion 85 is driven through the belt 40, with the result that the cylindrical shaft portion 87 having the gear portion 85 fixed to the upper end thereof is rotated in the circumferential direction through a predetermined angle. Consequently, the adapter plate 76 provided on the upper end of the cylindrical shaft 87 is rotated clockwise through a predetermined angle about the lower electrode 27b which forms the center axis of rotation. As a result, as shown in FIG. 9, the resistor wire 39 provided on the rear end of the core 66 is pulled towards the rear end of the core 11 by an amount corresponding to the above-mentioned predetermined angle, so as to be positioned obliquely on the trailing end portion of the core 11 when viewed in plan.

Subsequently, the spindles 58, 58 are rotated by a predetermined number so that the above-mentioned obliquely positioned resistor wire 39 is obliquely wound around the trailing end cap 12b so as to be located on the axis of the rear end cap 12b.

Figure 10:
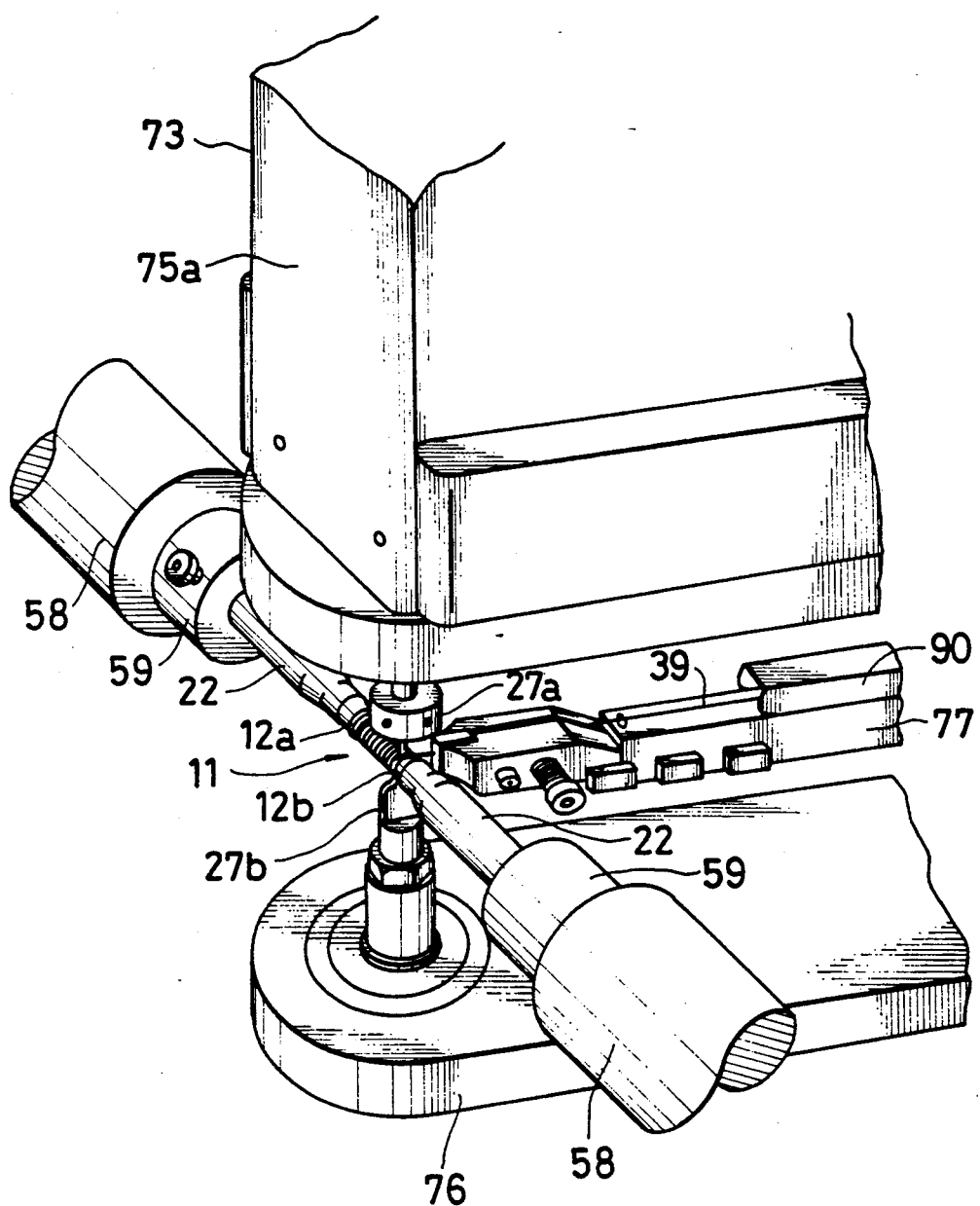

Then, as shown in FIG. 10, the upper and lower electrode members 27a and 27b are projected again from the bodies 75a, 75b so that the upper electrode member 27a is pressed against the upper side of the trailing end cap 12b through the obliquely positioned resistor wire 39 while the lower electrode member 27b is pressed against the lower side of the trailing end cap 12b, whereby the core 11 is clamped between the upper and lower electrode members 27a, 27b with the resistor wire 39 pressed thereto.

Subsequently, the resistor wire nozzle advancing/retracting mechanism 26 is operated so that the resistor wire supply nozzle 77 is made to slide rearward on the slide base 82 by the drive portion 83. Then, with a slight delay after the operation of the resistor wire advancing/retracting mechanism 26, the above-mentioned resistor wire fixing mechanism 25 is operated to activate the pneumatic cylinder 91 so that the resistor wire 39 is fixed in the resistor wire supply nozzle 77 by the resistor wire clamper 90.

Subsequently, an electric current is supplied to flow between the upper and lower electrode members 27a and 27b so that the above-mentioned resistor wire 39 is welded to the trailing end cap 12b. During the welding of the resistor wire 39 to the trailing end end cap 12b by the operation of the upper and lower electrode members 27a, 27b, the resistor wire supply nozzle 77 continues to move backward while the resistor wire 39 is clamped by the resistor wire clamper 90, so that the resistor wire 39 is pulled rearward so as to be melt-cut at the point of welding to the trailing end cap 12b, whereby the coil resistor 10 is completed.

After the completion of the production of the coil resistor 10, the electrode drive portions 28, 28 are activated to temporarily retract the electrode members 27a, 27b and, thereafter, projected again to clamp the trailing end cap 12b and, hence, the formed coil resistor 10 at its upper and lower sides. Subsequently, the holding means drive portion 23 is activated to move the spindles 58, 58 outwardly in the breadthwise direction of the automatic resistor coil winding apparatus 16 of this embodiment, so that the chucks 22,22 provided on the front ends of the spindles 58, 58 are set to the initial positions.

The coil resistor 10 clamped and cantilevered at its upper and lower sides by the upper and lower electrode members 27a, 27b is allowed to drop into a suitable parts collecting portion (not shown) as the upper and lower electrode members 27a, 27b are retracted to release the coil resistor 10 as a result of a subsequent operation of the electrode drive portions 28, 28.

Then, a new core 11 is automatically fed from the parts feeder (not shown) to the core support arms 46, 46 on the end of the arm portion 47 of the core supply portion 44. Then, the drive portion 49 of the core supply portion 44 is actuated to extend the arm portion 47 so as to bring the core 11 to a position where its axis is aligned with the common axis of the chucks 22, 22. The arm 47 is then stopped.

Subsequently, the pair of holding means drive portions 23 operate to move the spindles 58, 58, the holding means rotating portions 24, 24 on the rear ends of the spindles 58, 58, chuck fixing portions 59, 59 on the ends of the spindles 58, 58, and the chucks 22,22 on the chuck fixing portions 59, 59 towards the inner side of the automatic resistor coil winding apparatus 16. Then, as described before, the chucks 22,22 are moved towards each other from the axially outer sides of the lead wires 13,13 projecting from both axial ends of the core 11 and held on the core support arms 46, 46 of the core supply portion 44, as shown by broken lines in FIG. 4. As a consequence, the lead wires 13,13 are received in the axial elongated holes 61, 61 formed in the chucks 22, 22 and the chucks come into contact with both axial end surfaces of the body 66 of the core, whereby the core 11 is held by the chucks 22, 22. Subsequently, as shown in FIG. 12, the resistor wire supply nozzle rotating portion 29 is operated so that the resistor wire supply nozzle 77 is rotated in the direction reverse to that described before, i.e., clockwise, around the electrode body 27 which forms the center axis of rotation, so as to form a right angle to the axis of the core 11.

Figure 13:
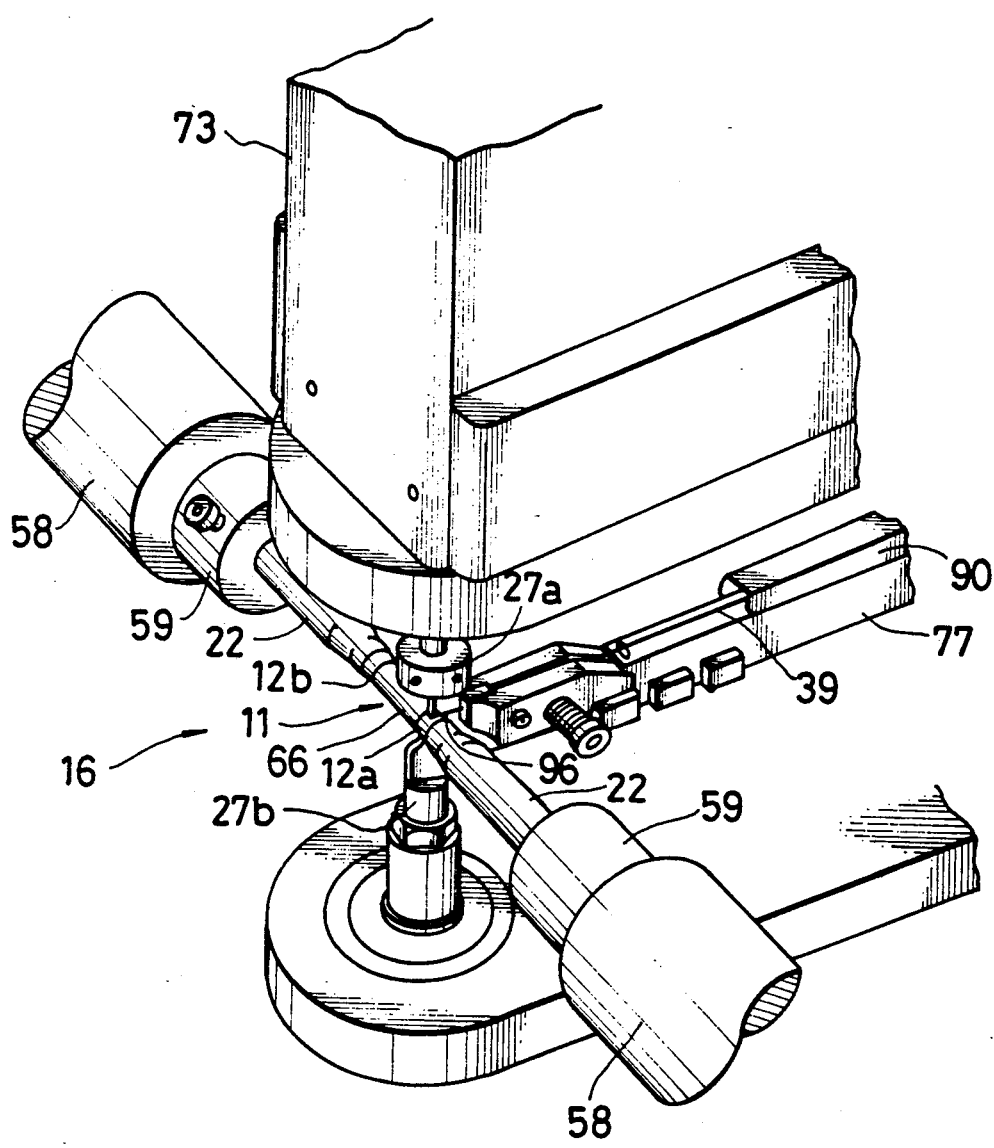
Figure 14:
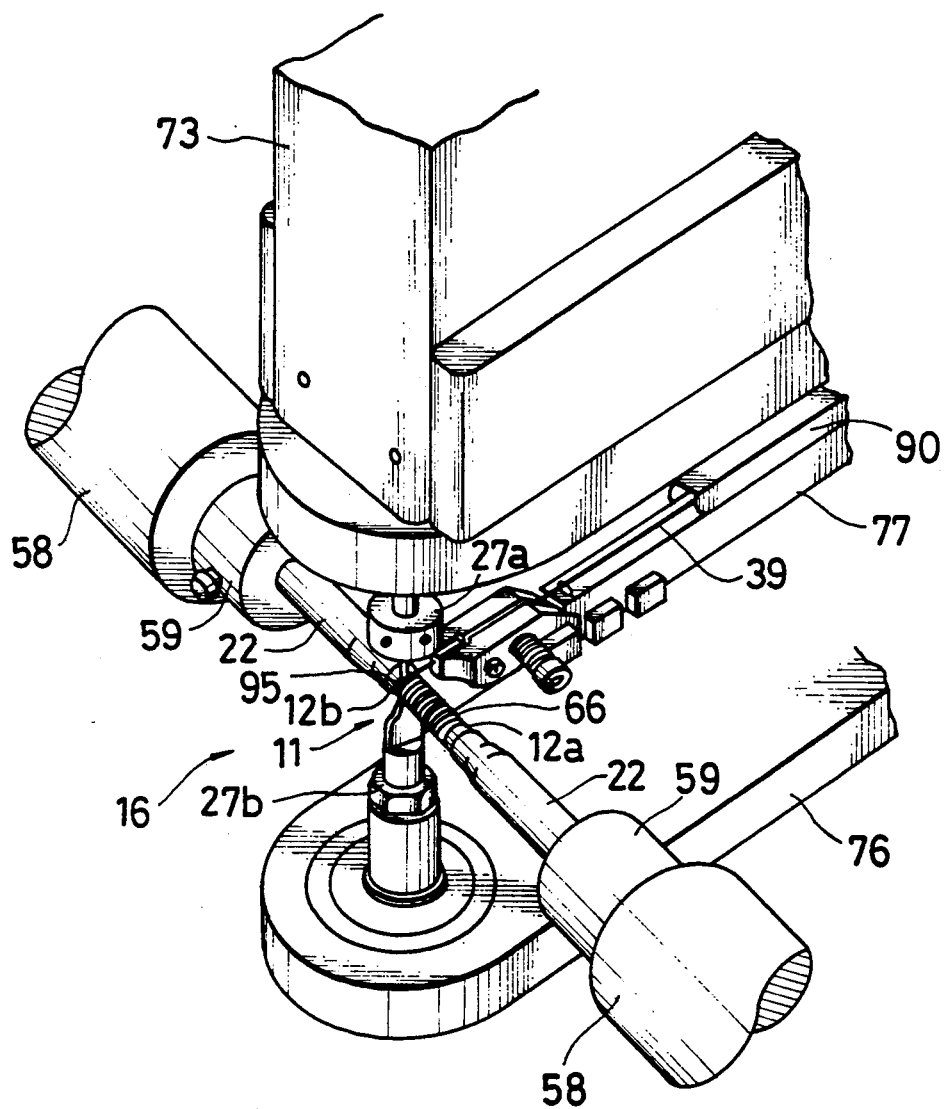

Then, as shown in FIG. 13, the resistor wire supply nozzle advancing/retracting mechanism 26 is operated so that the resistor wire supply nozzle 77, which has been retracted from the core 11, is moved forward to a position where it can wind the resistor wire 39 on the core 11.

In the welding of the resistor wire to the trailing end of the preceding core 11, the operation was conducted as follow. Namely, after the core 11 was clamped between the upper and lower electrode members 27a, 27b with the resistor wire 39 pressed to the core 11, the resistor wire supply nozzle advancing/retracting mechanism 26 was operated to cause the resistor wire supply nozzle to slide rearward and, with a slight delay thereafter, the resistor wire was melt-cut by the electrode member 27 while the resistor wire 39 was fixed in the resistor wire supply nozzle 77 by the resistor wire fixing mechanism 25. As a result of the rearward movement of the resistor wire supply nozzle 77 before the cutting, the resistor wire has been pulled out of the resistor wire supply nozzle 77 by a predetermined length which provides a welding margin for welding the winding starting end 96 of the resistor wire 39 on the new core 11 shown in FIG. 13.

Figure 11:
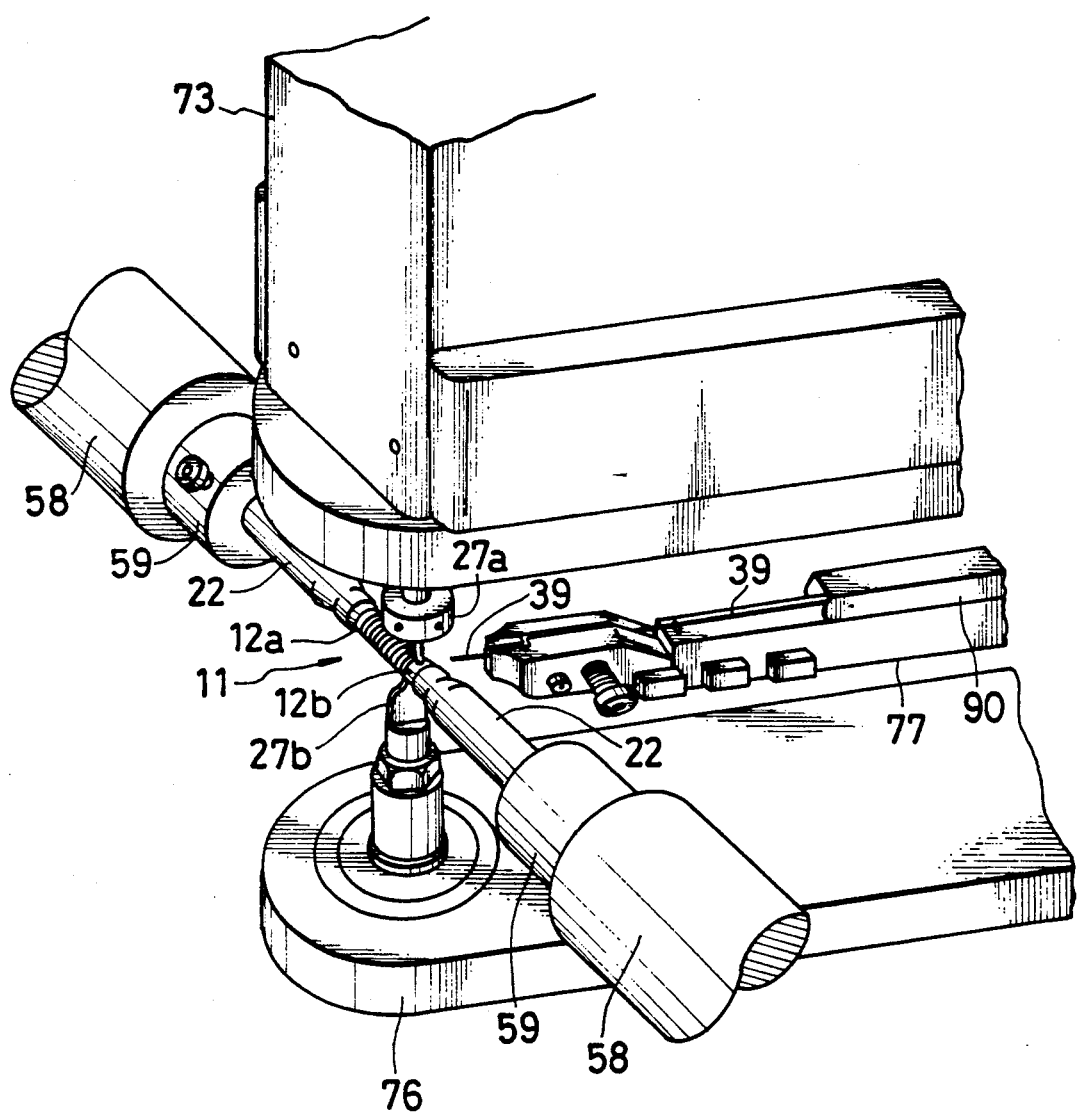
Figure 12:
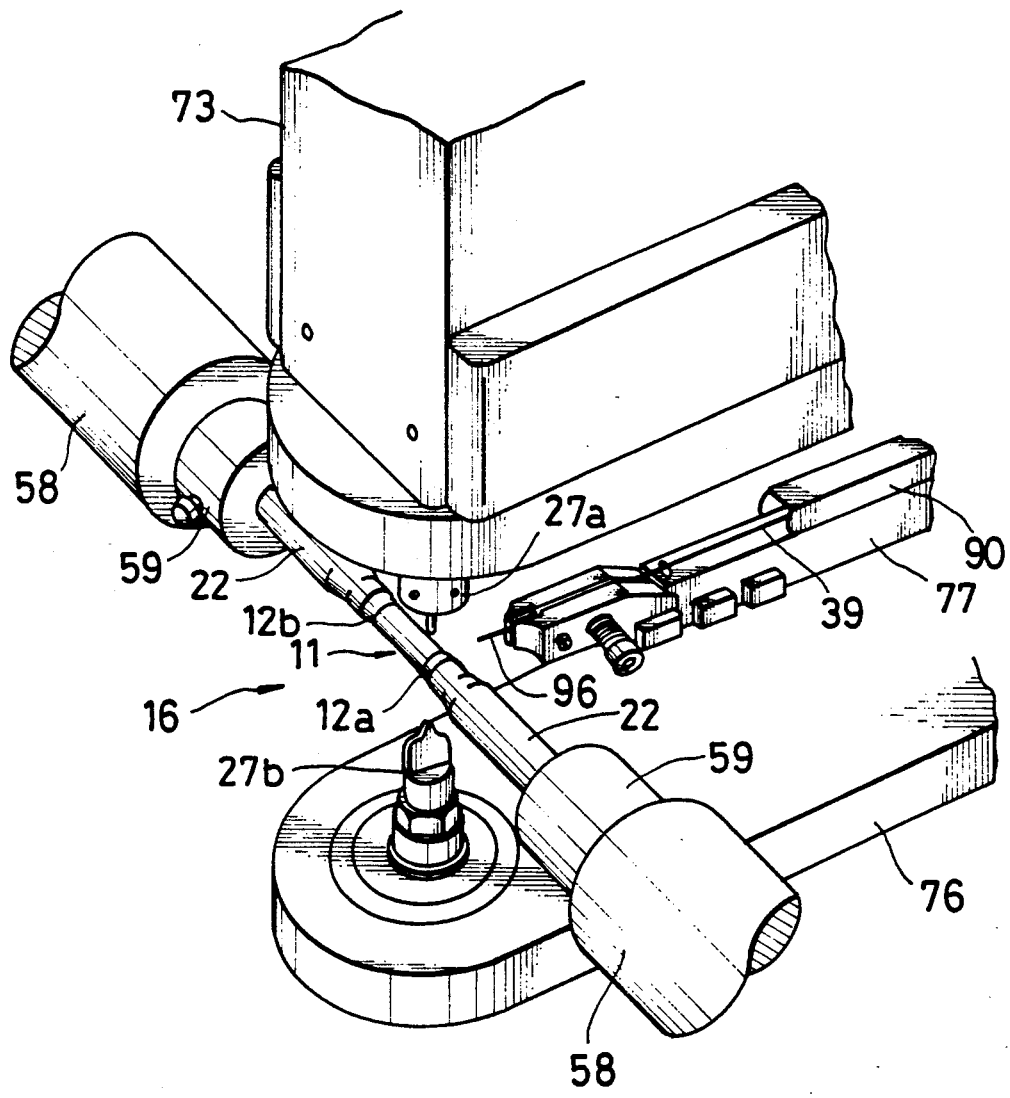

Thus, a certain length of the resistor wire 39 serving as the winding starting end 96 of the resistor wire 39 has been projected from the end of the resistor wire supply nozzle 77 which is stationed at a right angle to the axis of the core 11, as shown in FIGS. 11 and 12. It is therefore possible to bring the winding starting end portion 96 of the resistor wire 39 into contact with the upper side of the leading end cap 12a on the core 11 by a forward movement of the resistor wire supply nozzle 77.

Subsequently, the electrode drive portions 28, 28 operate to project the upper and lower electrode members 27a, 27b of the welding electrode portion 19 so that the lower electrode member 27b contacts the lower side of the leading end cap 12a on the core 11 while the upper electrode member 27a is pressed onto the upper side of the leading end cap 12a with the resistor wire 39 placed therebetween.

Then, as an electric current is supplied to flow between the upper electrode member 27a and the lower electrode member 27b, the winding starting portion 96 of the resistor wire 39 is welded to the upper side of the leading end cap 12a. The electrode drive portions 28, 28 are then operated to retract the upper and lower electrode members 27a, 27b upward and downward away from the core 11.

Then, as in the case of winding on the preceding core 11, the holding means rotating portion 24 is activated to rotate the spindles 58, 58 so that the core 11 fixed to the ends of the spindles 58, 58 through chucks 22, 22 is rotated by a predetermined number of turns and, at the same time, the pulse motor 37 of the slide base drive portion 36 is operated so that the feed screw portion 38 is rotated in the direction reverse to that in the winding on the preceding core 11.

Therefore, the frame 68 which engages with the feed screw portion 38 through the inverse-threaded portion 55 and which is now located at a position adjacent the side plate frame 32b starts to slide towards the initial position in accordance with the rotation of the feed screw portion 38.

As in the case of the preceding winding operation, the core 11 clamped between the chucks 22, 22 is rotated in accordance with the rotation of the spindles 58, 58, so that the resistor wire 39, the winding starting end 96 of which has been welded to the lading end cap 12a of the core 11, is continuously extracted from the resistor wire supply nozzle 77. Meanwhile, the resistor wire supply nozzle is moved together with the frame 68 in the axial direction of the core 11 towards the rear end of the same, i.e., to the left as viewed in FIG. 1, so that the resistor wire 39 is wound on the body 66 of the core 11 as in the case of the preceding winding operation.

When the resistor wire supply nozzle 77 has reached the trailing end of the core body 66, the winding terminal end portion 95 of the resistor wire 39 is welded to the trailing end cap 12b on the core 11. This can be done in the following manner. Namely, the rotation of the spindles 58, 58 forming the core holding portion 17 is temporarily stopped and, thereafter, the resistor wire supply nozzle rotating portion 29 is operated to cause the resistor wire supply nozzle 77 to rotate through a predetermined angle about the electrode member 27 which forms the center axis of rotation in the direction of movement of the resistor wire supply nozzle 77, thus changing the direction of supply of the register wire 39.

Figure 15:
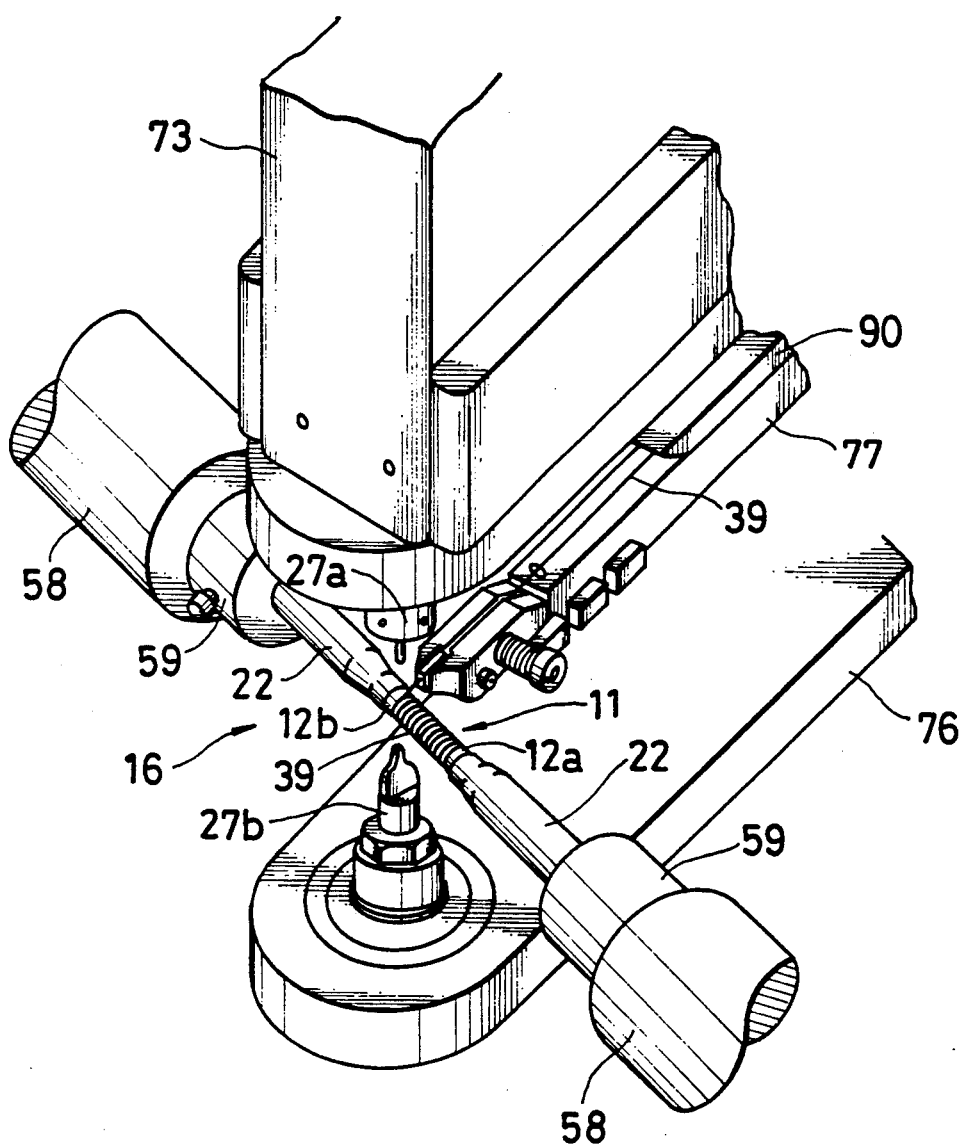

Consequently, as shown in FIG. 15, the resistor wire 39 which is located on the trailing end of the core body 66 is pulled rearward by an amount corresponding to the predetermined angle of rotation of the resistor wire supply nozzle 77, so as to be positioned obliquely on the rear end portion of the core 11 when viewed in plan.

Subsequently, the spindles 58, 58 are rotated by a predetermined number of turns so that the obliquely positioned resistor wire 39 is obliquely placed on the terminal end cap 12b on the core 11 and is located on the axis of the trailing end cap 12b.

Subsequently, the upper and lower electrode members 27a, 27b are projected so that the core 11 is held between these electrode members with the resistor wire 39 pressed to the core 11.

Then, as in the preceding winding operation described before, the resistor wire nozzle advancing/retracting mechanism 26 is operated to retract the resistor wire 77 and, with a slight delay thereafter, the resistor wire fixing mechanism 25 is operated to fix the resistor wire 39 within the resistor wire supply nozzle 77 and, thereafter, electrical current is supplied to flow between the upper and lower electrode members 27a, 27b, whereby the resistor wire 39 is welded to the trailing end cap 12b.

Figure 16:
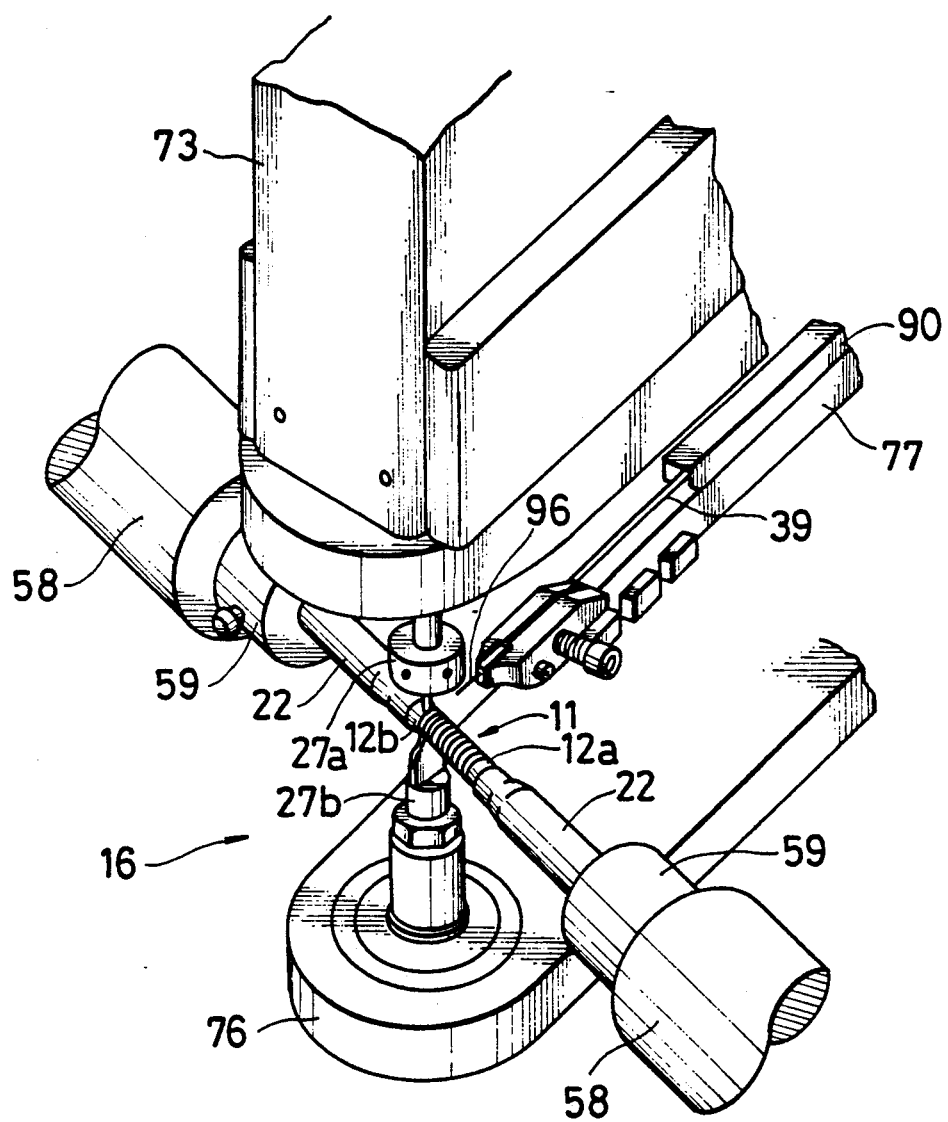

After the melt-cutting of the resistor wire 39, a certain length of the resistor wire 39 projects from the resistor wire supply nozzle 77 so as to provide the welding margin for the winding starting end portion 96 for the next coil winding operation, as shown in FIG. 16.

As will be understood from the foregoing description, the automatic resistor wire winding apparatus of this embodiment can continuously wind the resistor wire 39 on successive cores 11 in either axial direction of the cores 11. In the described embodiment of the automatic resistor coil winding apparatus 16, the resistor wire supply nozzle 77 is rotated by the resistor wire supply nozzle rotating portion 29 through a predetermined angle about the electrode member 27 which forms the center axis of rotation in the direction of movement of the resistor wire supply nozzle 77, before the winding terminal end 95 of the resistor wire 39 is welded to the core 11. This rotation is conducted to realize a substantially complete contact between the resistor wire 39 and the trailing end cap 12b to ensure a good quality of the welding.

Figure 19:
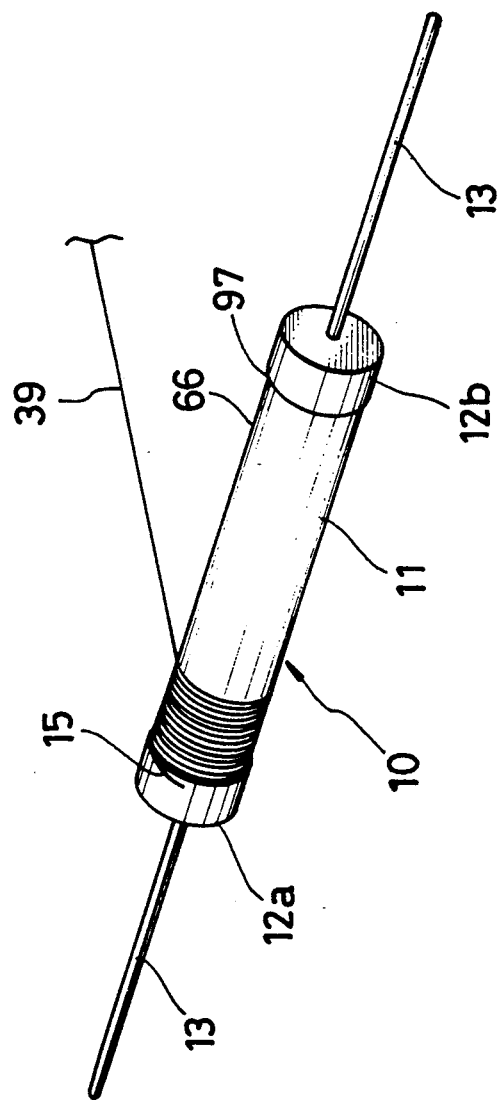
FIG. 19 is a perspective view in which a resistor wire is being wound on a core of to form an ordinary coil resistor.

More specifically, the reason why the above-mentioned rotation is conducted is as follows. Referring to FIG. 19, the body 66 of the core is capped at its both ends with the caps 12a,12b, so that a step of a height corresponding to the wall thickness of the caps is formed between the peripheral surface of the body 66 and the peripheral surface of each cap at each axial end of the core 11.

Therefore, if the resistor wire 39 wound at a right angle to the axis of the core 11 is welded to the trailing end cap 12b in the same posture, i.e., at a right angle to the axis of the core, an incomplete contact may be formed between the resistor wire 39 and the peripheral edge 97 of the axially inner end of the trailing end cap 12b as the resistor wire 39 is wound beyond the above-mentioned peripheral edge 97, before the resistor wire 39 is welded to the trailing end cap 12b.

If the welding is conducted leaving an incomplete state of contact between the resistor wire 39 and the peripheral edge of the trailing end cap 12b, the electric resistance produced by the resistor wire 39 is made quite unstable at the point of incomplete contact between the resistor wire 39 and the trailing end cap 12b, with the result that the resistance value of the coil resistor as a commercial product is seriously degraded.

This problem, however, is overcome by the described embodiment of the automatic resistor coil winding apparatus which has the resistor wire supply nozzle rotating portion 29 capable of rotating the resistor wire supply nozzle 77 through a predetermined angle in the direction of movement of the resistor wire supply nozzle 77 before the winding terminal end portion of the resistor wire is welded. Thus, in the described embodiment, the direction of supply of the resistor wire 39 is changed such that the winding terminal end portion of the resistor wire 39 crosses the axially inner peripheral edge 97 of the trailing end cap 12b at a large angle. Therefore, a substantially complete contact is obtained between the resistor wire 39 and the axially inner peripheral edge 97 of the trailing end cap 12b when the resistor wire 39 is wound over this peripheral edge 97.

As a consequence, in the described embodiment of the automatic resistor coil winding apparatus 16 of this embodiment, the winding terminal end portion 95 of the resistor wire 39 is welded to the trailing end cap 12b while making a good contact between itself and the cap 12b, so that the coil resistors 10 produced by this apparatus stably exhibit substantially constant resistance value without fluctuation.

The resistor wire supply nozzle rotating portion 29 incorporated in the resistor wire supply portion 18 in the described embodiment of the automatic resistor coil winding apparatus 16 is capable of rotating the resistor wire supply nozzle 77 about the electrode member 27 which forms the center axis of rotation in either direction along the axis of the core 11 held by the core holding portion 17.

Therefore, the resistor wire supply nozzle 77 can be rotated in the direction of movement thereof each time the winding terminal end portion 95 of the resistor wire 39 is welded after the arrival of the resistor wire supply nozzle to the winding end position, whereby the coil winding and welding are conducted both in the forward and backward stroking of the resistor wire supply nozzle 77.

Namely, by suitably setting the control parameters before the operation of the described embodiment of the automatic resistor coil winding apparatus 16, the resistor wire 39 can be wound on the core 11 at a predetermined pitch during axial stroking of the resistor wire supply nozzle 77 from the leading end cap 12a on one end of the core 11 to the trailing end cap 12b on the other end. Then, winding of the resistor wire on the next core 11 is commenced from the position wherein the winding on the preceding coil is finished, without requiring the resistor wire supply nozzle 77 to be returned to the initial position where the winding on the preceding core 11 was commenced. The winding of the resistor wire 39 on this next core 11 can be completed during stroking of the resistor wire supply nozzle 77 back to the above-mentioned initial position.

The described embodiment of the automatic resistor coil winding apparatus, therefore, can easily produce a coil resistor 98 of FIG. 17 in which the resistor wire 39 is wound in two layers in a crossing manner.

To form the two-layered coil resistor 98 shown in FIG. 17, the resistor wire 39 is wound at a large pitch to form the first wire layer during forward stroking of the resistor wire supply nozzle 77 along the axis of the core 11 and, during backward stroking of the resistor wire supply nozzle 77, the resistor wire 39 is wound to form the second layer of the wire at the same pitch so as to cross the wire of the first layer.

The coil resistor 98 having layers of resistor wire 39 wound in a crossing manner is effective in preventing generation of noise produced by the magnetic field generated around the resistor wire 39, and is suitably used in, for example, a VTR. It is quite advantageous that such a coil resistor 98 with wires 39 wound in crossing manner can easily be produced by the automatic resistor coil winding apparatus of this embodiment.

The described embodiment of the automatic resistor coil winding apparatus is suitable also for producing a coil resistor 99 of FIG. 18 in which a pair of resistor wires 39 of small diameter are wound at a predetermined pitch in close contact with each other.

To form the coil resistor 99, a first resistor wire 39 is wound at a comparatively large pitch during forward stroking of the resistor wire supply nozzle 77 and, during the backward stroking of the resistor wire supply nozzle 77 back to the starting position, a second resistor wire 39 is wound in close contact with the first resistor wire 39 which has already been wound on the core.

The coil resistor 99 having two resistor wires 39, 39 of small diameter wound in close contact with each other is suitable for use as a low-resistance resistor. Conventionally, low-resistance resistor coils have been produced by using resistor wires of comparatively large diameter. Low-resistance resistor coils produced by the conventional method using resistor wires of comparatively large diameters, however, make it difficult to conduct marking after the winding, because the interval between the turns of the wound resistor wire is extremely small.

In contrast, the described embodiment of the automatic resistor coil winding apparatus 16 can easily produce such a low-resistance coil resistor which facilitates the subsequent marking process, because this apparatus can wind two resistor coils of a smaller diameter than that of the wire used in the conventional method in close contact with each other.

In the described embodiment of the automatic resistor coil winding apparatus of the present invention, the resistor wire supply nozzle rotating portion 29 operates to rotate the resistor wire supply nozzle 77 about the electrode members 27 which forms the center axis of rotation in either direction along the axis of the core 11 held on the core holding portion 17. Therefore, the resistor wire 39 can be supplied and placed always on the extension of the axis of the upper and lower electrode members 27a, 27b at the peripheral surface of the cap 12a or 12b.

Therefore, even after the resistor wire supply nozzle 77 is rotated in the direction of movement of the resistor wire supply nozzle 77 for enabling welding of the winding terminal end 95 of the resistor wire 39, the resistor wire 39 fed from the end of the resistor wire supply nozzle 77 and placed on the surface of the cap 12a or 12b is located immediately under the upper electrode member 27a without fail, thus ensuring good quality of welding of the resistor wire 39 to the cap 12a or 12b on the core 11 by the electrode members 27.

Although the invention has been described through its specific forms, it is to be understood that the described embodiments are only illustrative and are not intended for limiting the scope of the invention. Rather, various changes and modifications may be imparted to the described embodiments without departing from the scope of the invention which is limited solely by the appended claims.

What is claimed is:

1. An automatic resistor coil winding apparatus, for winding resistor wire onto a cylindrical core of a resistor having axially spaced leading and trailing ends, comprising:

a core holding portion for holding both axially spaced ends of said cylindrical core, in such a manner that said core is rotatable in a direction of a peripheral surface thereof;

a resistor wire supply portion having a resistor wire supply nozzle for supplying a resistor wire to be wound on the peripheral surface of said core held by said holding portion;

a welding electrode portion for welding the resistor wire supplied from the resistor wire supply nozzle proximate to said leading end and said trailing end of said core; and a slide base carrying said resistor wire supply portion and said welding electrode portion and reciprocatingly movable in the axial directions of said core held by said core holding portion;

said core holding portion including a pair of holding means arranged coaxially at a predetermined spacing from each other so as to be able to hold both ends of said core, a holding means drive portion for driving said pair of holding means toward and away from each other along the axis of said core, and a holding means rotating portion for rotating said core held by said holding means in the direction of the peripheral surface of said core;

said resistor wire supply portion comprising a resistor wire fixing mechanism for temporarily fixing the resistor wire supplied to said core and a resistor wire supply nozzle advancing/retracting mechanism capable of moving the resistor wire supply portion away from the core, said resistor wire supply nozzle being arranged on said slide base so as to be located at the same position as said welding electrode portion in the direction along the axis of the core held by said core holding portion;

said welding electrode portion including a pair of electrode members disposed above and below said core held at its both axial ends by said core holding portion, said electrode members defining an axis and being adapted to be moved along said axis of said electrode members to weld said resistor wire to the leading and trailing ends of said core, and an electrode drive portion for driving said electrode members up and down;

said resistor wire supply portion further comprising a resistor wire supply nozzle rotating portion including motor means for rotating said resistor wire supply nozzle through a predetermined angle about said axis of said electrode members in either direction along the axis of said core held by said core holding portion thereby changing the direction of supply of said resistance wire.

2. An automatic resistor coil winding apparatus according to claim 1, wherein said resistor wire comprises a winding terminal and such that, when said resistor wire is wound on said core held on said core holding portion from one of said ends to the other of said ends of said core so as to be welded at the winding terminal end thereof to said other of said ends of said core, said resistor wire supply nozzle rotating portion rotates said resistor wire supply nozzle through a predetermined angle in the direction of movement of said resistor wire supply nozzle, thereby changing the direction of supply of said resistor wire, and supplies said resistor wire so that said resistor wire is wound from said other of sad ends to said one of said ends of said core and, when the winding terminal end is welded to said one of said ends of said core, said resistor wire supply nozzle rotating portion rotates said resistor wire supply nozzle through a predetermined angle in the direction of movement of said resistor wire supply nozzle thereby changing the direction of supply of said resistor wire, whereby said resistor wire can be wound on said core continuously in either axial direction.

3. An automatic resistor coil winding apparatus according to claim 1, wherein said resistor wire comprises a winding terminal end and said resistor wire supply nozzle rotating portion rotates, when said resistor wire has been wound on said core held by said core holding portion from one of said ends to the other of said ends of said core and is going to be welded at its winding terminal end to said other of said ends of said core, said resistor wire supply nozzle through a predetermined angle in the direction of movement of said resistor wire supply nozzle about said axis of said electrode members.

4. An automatic resistor coil winding apparatus according to claim 1, wherein said holding means includes a cylindrically-shaped chuck, a chuck fixing portion for fixing said chuck, a spindle portion supported at a front end of said chuck fixing portion, and a casing member in which said spindle portion is mounted for movement back and forth.

5. An automatic resistor coil winding apparatus according to claim 4, wherein said chuck has a cylindrical form with elongated side surfaces and is provided at its front end with an opening of a diameter greater than the diameter of lead wires projecting from both ends of said core, said chuck being provided therein with an elongated hole extending along the axis of said chuck and communicating with said opening, an inner surface of said elongated hole including a tapered portion adjacent said opening so that the diameter of said elongated hole progressively increasing towards said opening.

6. An automatic resistor coil winding apparatus according to claim 1, wherein said holding means drive portion includes a pneumatic cylinder.

7. An automatic resistor coil winding apparatus according to claim 1, wherein said holding means rotating portion includes a pulse motor.

8. An automatic resistor coil winding apparatus according to claim 1, wherein said slide base is driven by a slide base drive portion.

9. An automatic resistor coil winding apparatus according to claim 8, wherein said slide base drive portion includes a reversible pulse motor, a feed screw portion extended from a spindle of said reversible pulse motor, and an inverse threaded portion provided in said slide base and meshing with said feed screw portion.

10. An automatic resistor coil winding apparatus according to claim 1, wherein said resistor wire supply nozzle rotating portion includes a drive portion having a pulse motor, an adapter plate for fixing said drive portion to a lower electrode portion, a first cylindrical shaft portion having a lower end fixed to an upper surface of an end portion of a first fixing plate and rotatably inserted in an upper electrode portion, a second cylindrical shaft portion having an upper end fixed to a lower surface of an end portion of a second fixing plate and rotatably extended through the lower electrode portion, a drive gear fixed to a spindle portion projecting from said driving portion, a driven gear formed on the upper end of said second cylindrical shaft portion, and a transmission means through which said drive gear is drivingly connected to said driven gear.

11. An automatic resistor coil winding apparatus according to claim 1, wherein said core is supplied to said core holding portion by a core supply portion.

12. An automatic resistor coil winding apparatus according to claim 11, wherein said core supply portion includes a pneumatic cylinder, a drive portion actuated by said pneumatic cylinder, a piston projected from said drive portion, an arm portion having a substantially U-shaped planar form fixed to the end of said piston, and a core support arm projected forwardly from said arm portion, wherein, when said drive portion is actuated to forwardly move said arm portion by said piston while said core is supported by said core support arm, said core supported by said support arm is brought to a position on the axis of said chuck which forms said holding means.

13. An automatic resistor coil winding apparatus according to claim 1, wherein said resistor wire fixing mechanism includes a driving mechanism having a resistor wire clamper and a pneumatic cylinder for actuating said resistor wire clamper.

14. An automatic resistor coil winding apparatus according to claim 1, wherein said resistor wire supply nozzle advancing/retracting mechanism includes said slide base and a drive portion provided on said slide base and adapted for moving said resistor wire supply nozzle back and forth.

15. An automatic resistor coil winding apparatus according to claim 14, wherein said drive portion includes a pneumatic cylinder.

16. An automatic resistor coil winding apparatus according to claim 1, wherein an electric current is supplied to said welding electrode portion to weld said resistor wire to the trailing end of said core as viewed in a winding direction, said resistor wire being fixed to said resistor wire fixing mechanism and pulled rearward of said resistor wire supply nozzle by said resistor wire supply nozzle advancing/retracting mechanism during the supply of said electric current.

17. An automatic resistor coil winding apparatus according to claim 16, wherein said resistor wire is fixed in said resistor wire supply nozzle by said resistor wire fixing mechanism after said resistor wire supply nozzle has been moved rearward by said resistor wire nozzle advancing/retracting mechanism.

* * * * *